United States Patent
De Angelis et al.

(10) Patent No.: US 12,017,944 B2
(45) Date of Patent: Jun. 25, 2024

(54) GLASS FORMING APPARATUSES COMPRISING MODULAR GLASS FINING SYSTEMS

(71) Applicant: CORNING INCORPORATED, Corning, NY (US)

(72) Inventors: Gilbert De Angelis, Lindley, NY (US); Juan Camilo Isaza, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 639 days.

(21) Appl. No.: 17/277,948

(22) PCT Filed: Sep. 20, 2019

(86) PCT No.: PCT/US2019/052071
§ 371 (c)(1),
(2) Date: Mar. 19, 2021

(87) PCT Pub. No.: WO2020/068569
PCT Pub. Date: Apr. 2, 2020

(65) Prior Publication Data
US 2021/0347668 A1    Nov. 11, 2021

(51) Int. Cl.
*C03B 5/225* (2006.01)
*C03B 5/42* (2006.01)
(Continued)

(52) U.S. Cl.
CPC ............... *C03B 5/225* (2013.01); *C03B 5/42* (2013.01); *C03B 5/43* (2013.01); *C03B 7/07* (2013.01)

(58) Field of Classification Search
CPC .. C03B 7/14; C03B 5/42; C03B 5/225; C03B 17/064
See application file for complete search history.

(56) References Cited

U.S. PATENT DOCUMENTS 1,647,083 A * 10/1927 Croll .................... F27B 7/28
266/286
1,751,008 A * 3/1930 La France ............... C03B 5/44
432/248
(Continued)

FOREIGN PATENT DOCUMENTS

CN    101932530 A    12/2010
CN    101675009 B  * 11/2012 ............. C03B 5/225
(Continued)

OTHER PUBLICATIONS

Taiwanese Patent Application No. 108134396, Office Action, dated May 2, 2023, 1 page; Taiwanese Patent Office.
(Continued)

*Primary Examiner* — Alison L Hindenlang
*Assistant Examiner* — Steven S Lee
(74) *Attorney, Agent, or Firm* — Kevin M. Able

(57) ABSTRACT

Disclosed herein are embodiments of glass manufacturing apparatuses. The glass manufacturing apparatuses may include a glass fining module. The glass fining module may include a refractory metal vessel comprising a length extending in a longitudinal direction. A plurality of insulation layers may surround at least a portion of the refractory metal vessel. The plurality of insulation layers may comprise an insulation structure extending around at least a portion of the refractory metal vessel and comprising a plurality of arched portions and a bulk insulation structure surrounding the insulation structure. An exterior support structure may at least partially surround the plurality of insulation layers. Rollers may be coupled to the exterior support structure such that the glass fining module is translatable in the longitudinal direction on the rollers.

20 Claims, 13 Drawing Sheets

(51) Int. Cl.
*C03B 5/43* (2006.01)
*C03B 7/07* (2006.01)

(56) References Cited

U.S. PATENT DOCUMENTS

| | | | | |
|---|---|---|---|---|
| 2,727,737 | A * | 12/1955 | Dole | F27D 1/045 |
| | | | | 52/603 |
| 3,269,070 | A * | 8/1966 | Stoy | F23M 5/06 |
| | | | | 52/249 |
| 3,800,014 | A * | 3/1974 | Brichard | C03B 5/43 |
| | | | | 266/286 |
| 3,953,009 | A * | 4/1976 | Kan | F27B 3/12 |
| | | | | 52/249 |
| 4,428,730 | A * | 1/1984 | Holmes | F27D 3/02 |
| | | | | 432/3 |
| 4,541,098 | A | 9/1985 | Heubach | |
| 4,897,103 | A * | 1/1990 | Weilacher | C03B 7/02 |
| | | | | 65/346 |
| 4,989,843 | A * | 2/1991 | Dittrich | F27D 1/145 |
| | | | | 266/283 |
| 5,002,600 | A * | 3/1991 | Sorg | C03B 7/02 |
| | | | | 65/346 |
| 5,078,182 | A * | 1/1992 | Kraft | F16L 59/21 |
| | | | | 138/147 |
| 7,150,165 | B2 | 12/2006 | Pitbladdo | |
| 7,377,132 | B2 | 5/2008 | Hamashima et al. | |
| 8,196,434 | B2 | 6/2012 | Pitbladdo | |
| 8,240,170 | B2 | 8/2012 | De Angelis et al. | |
| 8,257,645 | B2 * | 9/2012 | Lee | F27D 1/04 |
| | | | | 266/286 |
| 8,402,787 | B2 | 3/2013 | Purnode et al. | |
| 8,408,029 | B2 * | 4/2013 | De Angelis | C03B 7/07 |
| | | | | 65/135.1 |
| 8,857,219 | B2 | 10/2014 | De Angelis et al. | |
| 8,925,353 | B2 | 1/2015 | Fraley et al. | |
| 9,546,103 | B2 | 1/2017 | Niewiera | |
| 9,725,349 | B2 | 8/2017 | Demirbas et al. | |
| 2004/0154336 | A1 | 8/2004 | Pitbladdo | |
| 2006/0242995 | A1 | 11/2006 | Bookbinder et al. | |
| 2009/0120133 | A1* | 5/2009 | Fraley | C03B 5/225 |
| | | | | 65/347 |
| 2011/0113827 | A1* | 5/2011 | De Angelis | C03B 7/07 |
| | | | | 65/181 |
| 2014/0116095 | A1* | 5/2014 | Fraley | F27D 1/14 |
| | | | | 65/181 |
| 2014/0123710 | A1* | 5/2014 | Lineman | C03B 5/16 |
| | | | | 65/135.1 |
| 2016/0031746 | A1 | 2/2016 | Niewiera | |
| 2016/0039702 | A1* | 2/2016 | Nagai | C03B 5/43 |
| | | | | 65/374.13 |
| 2017/0197863 | A1 | 7/2017 | Lansberry et al. | |
| 2017/0299112 | A1 | 10/2017 | Sauret et al. | |
| 2018/0273416 | A1 | 9/2018 | Demirbas et al. | |
| 2020/0299171 | A1 | 9/2020 | Tenyama et al. | |

FOREIGN PATENT DOCUMENTS

| | | | |
|---|---|---|---|
| CN | 103359914 A | 10/2013 | |
| CN | 103476716 A | 12/2013 | |
| CN | 104512995 A | 4/2015 | |
| CN | 105008290 A | 10/2015 | |
| CN | 107265833 A | 10/2017 | |
| CN | 214240777 U | 9/2021 | |
| EP | 2694446 B1 | 3/2015 | |
| GB | 0154861 A | 12/1920 | |
| JP | 2005-272181 A | 10/2005 | |
| JP | 2005272181 A * | 10/2005 | C03B 5/42 |
| JP | 2012-031053 A | 2/2012 | |
| JP | 2012031053 A * | 2/2012 | C03B 18/16 |
| JP | 2013-010672 A | 1/2013 | |
| JP | 2013010672 A * | 1/2013 | C03B 5/2252 |
| JP | 2013216535 A * | 10/2013 | C03B 18/18 |
| JP | 2014-009125 A | 1/2014 | |
| JP | 2014-047084 A | 3/2014 | |
| JP | 2014047084 A * | 3/2014 | C03B 5/225 |
| JP | 2014-069979 A | 4/2014 | |
| JP | 2014198656 A * | 10/2014 | |
| KR | 10-2019-0003381 A | 1/2019 | |
| TW | 200708489 A | 3/2007 | |
| TW | 200718664 A | 5/2007 | |
| TW | 201343581 A | 11/2013 | |
| TW | 201711967 A | 4/2017 | |
| TW | 201722804 A | 7/2017 | |
| TW | 201726564 A | 8/2017 | |
| WO | WO-2007020754 A1 * | 2/2007 | C03B 5/2252 |
| WO | 2012/026254 A1 | 3/2012 | |
| WO | 2012/132368 A1 | 10/2012 | |
| WO | WO-2012132368 A1 * | 10/2012 | C03B 17/064 |
| WO | 2013/150912 A1 | 10/2013 | |
| WO | 2014/050824 A1 | 4/2014 | |
| WO | WO-2015057646 A1 * | 4/2015 | C03B 5/225 |
| WO | 2017/035174 A1 | 3/2017 | |
| WO | 2017/053527 A1 | 3/2017 | |
| WO | 2018/017398 A1 | 1/2018 | |
| WO | 2018/110217 A1 | 6/2018 | |
| WO | 2018/146908 A1 | 8/2018 | |
| WO | WO-2018146908 A1 * | 8/2018 | C03B 17/06 |
| WO | 2019/165402 A1 | 8/2019 | |
| WO | 2020/068750 A1 | 4/2020 | |

OTHER PUBLICATIONS

Chinese Patent Application No. 201980076804.0, Office Action, dated Sep. 30, 2022, 29 pages, (16 pages of English Translation and 13 pages of Original Copy); Chinese Patent Office.

Chinese Patent Application No. 201980076808.9, Office Action, dated Oct. 8, 2022, 13 pages (7 pages of English Translation and 6 pages of Original Copy); Chinese Patent Office.

International Search Report and Written Opinion of the International Searching Authority;PCT/US2019/52601; Mailed on Mar. 2, 2020, 14 pages; European Patent Office.

International Search Report and Written Opinion of the International Searching Authority;PCT/US2019/052071; Mailed on Jan. 29, 2020, 13 pages; European Patent Office.

* cited by examiner

GLASS FORMING APPARATUSES COMPRISING MODULAR GLASS FINING SYSTEMS This application is a national stage application under 35 U.S.C. § 371 of International Application No. PCT/US2019/052071, filed on Sep. 20, 2019, which claims benefit of priority of U.S. Provisional Application Ser. No. 62/737,498 filed on Sep. 27, 2018 the contents of which are relied upon and incorporated herein by reference in their entirety as if full set forth below.

FIELD

The present specification relates to glass forming apparatuses and, more specifically, to glass forming apparatuses comprising modular glass fining systems.

TECHNICAL BACKGROUND

Fining systems are used in glass manufacturing processes to remove bubbles from molten glass. In general, after molten glass is generated from raw materials, the molten glass is subjected to a refining step where the bubbles within the molten glass are released at the free surface of the finer system. The bubbles, also referred to as blisters, form in the molten glass when dissolved gasses in the molten glass, such as oxygen and the like, coalesce and form bubbles in the molten glass. If not removed, these bubbles are frozen into the glass upon cooling and are considered undesirable defects that diminish the quality of the glass.

Fining systems may be subjected to high temperatures for extended durations of time. Cycling between room temperature conditions at which the fining system is built and high temperature operating conditions may introduce stresses to the components of the fining system. Because of the high temperature at which the fining system operates, regular and continuous introduction of stresses to the components of the fining system may lead to premature failure of those components. Further, increasing throughput of molten glass through a fining system may dictate the use of higher temperatures and/or longer lengths of the fining system, both of which may be associated with higher stresses on the fining system components and, therefore, reduced life of the components.

Accordingly, modular glass fining systems having elements that mitigate stress at operating conditions may be desired.

SUMMARY

According to a first aspect A1, a glass manufacturing apparatus may include a glass fining module. The glass fining module may include a refractory metal vessel comprising a length extending in a longitudinal direction. A plurality of insulation layers may surround at least a portion of the refractory metal vessel. The plurality of insulation layers may comprise an insulation structure extending around at least a portion of the refractory metal vessel and comprising a plurality of arched portions and a bulk insulation structure surrounding the insulation structure. An exterior support structure may at least partially surround the plurality of insulation layers. Rollers may be coupled to the exterior support structure such that the glass fining module is translatable in the longitudinal direction on the rollers.

A second aspect A2 includes the glass manufacturing apparatus of the first aspect A1, wherein the exterior support structure comprises: vertical tie supports that extend in a vertical direction; lateral tie supports that extend in a lateral direction perpendicular to the vertical direction, the lateral tie supports coupled to the vertical tie supports by springs that apply a first force in the vertical direction to the plurality of insulation layers; and longitudinal tie supports extending in the longitudinal direction, the longitudinal tie supports coupled to the vertical tie supports by springs that apply a second force in the lateral direction to the plurality of insulation layers.

A third aspect A3 includes the glass manufacturing apparatus of the first aspect A1 or the second aspect A2, wherein at least one of the plurality of arched portions comprise a relief region between the at least one of the plurality of arched portions and an adjacent arched portion of the insulation structure.

A fourth aspect A4 includes the glass manufacturing apparatus of the third aspect A3, wherein the refractory metal vessel comprises a stiffening rib extending from the refractory metal vessel and oriented perpendicular to the refractory metal vessel, the stiffening rib positioned in the relief region of the insulation structure.

A fifth aspect A5 includes the glass manufacturing apparatus of the fourth aspect A4, wherein the stiffening rib is spaced apart from the plurality of arched portions of the insulation structure.

A sixth aspect A6 includes the glass manufacturing apparatus of any of the fourth through fifth aspects A4-A5, wherein the stiffening rib extends from an upper portion of the refractory metal vessel.

A seventh aspect A7 includes the glass manufacturing apparatus of any of the fourth through sixth aspects A4-A6, wherein the refractory metal vessel comprises an end plate coupled to the stiffening rib.

An eighth aspect A8 includes the glass manufacturing apparatus of any of the first through seventh aspects A1-A7, wherein at least a portion of the refractory metal vessel is spaced apart from the insulation structure when the glass fining module is at room temperature.

A ninth aspect A9 includes the glass manufacturing apparatus of the eighth aspect A8, wherein the refractory metal vessel contacts the insulation structure when the glass fining module is at its operating temperature.

A tenth aspect A10 includes the glass manufacturing apparatus of any of the first through ninth aspects A1-A9, further comprising a gas vent opening into an interior of the refractory metal vessel.

An eleventh aspect A11 includes the glass manufacturing apparatus of any of the first through tenth aspects A1-A10, wherein the glass fining module further comprises at least one conductor flange in contact with the refractory metal vessel, wherein the conductor flange circumscribes an exterior of the refractory metal vessel and is positioned at a longitudinal end of the refractory metal vessel.

A twelfth aspect A12 includes the glass manufacturing apparatus of the eleventh aspect A11, wherein the at least one conductor flange comprises a bus portion coupled to electrical leads and a distribution portion in contact with the refractory metal vessel.

A thirteenth aspect A13 includes the glass manufacturing apparatus of the twelfth aspect A12, wherein the distribution portion comprises a non-uniform cross-sectional width.

A fourteenth aspect A14 includes the glass manufacturing apparatus of the twelfth through thirteenth aspects A12-A13, wherein the exterior support structure comprises a translatable support coupled to the bus portion and a spring configured to apply a force to the bus portion in a vertical direction.

A fifteenth aspect A15 includes the glass manufacturing apparatus of the twelfth through fourteenth aspects A12-A14, wherein the translatable support is electrically isolated from the at least one conductor flange.

A sixteenth aspect A16 includes the glass manufacturing apparatus of any of the first through fifteenth aspects A1-A15, further comprising a plurality of glass fining modules arranged sequentially, wherein each of the plurality of glass fining modules are maintained at different operating temperatures.

A seventeenth aspect A17 includes the glass manufacturing apparatus of the sixteenth aspect A16, further comprising a tie rod that selectively couples the plurality of glass fining modules to one another in the longitudinal direction.

An eighteenth aspect A18 includes the glass manufacturing apparatus of the sixteenth aspect A16 or the seventeenth aspect A17, wherein the refractory metal vessel is a continuous refractory metal vessel that extends through each of the plurality of glass fining modules.

A nineteenth aspect A19 includes the glass manufacturing apparatus of sixteenth aspect A16, wherein each of the plurality of glass fining modules comprises a discrete refractory metal vessel and the discrete refractory metals vessels are coupled to one another with glass seals.

A twentieth aspect A20 includes the glass manufacturing apparatus of any of the first through nineteenth aspects A1-A19, wherein the bulk insulation structure comprises a temperature relief region positioned in a vertical direction upward from the refractory metal vessel, the temperature relief region exhibiting a higher thermal conductivity than the bulk insulation structure.

A twenty-first aspect A21 includes the glass manufacturing apparatus of any of the first through twentieth aspects A1-A20, the supportive structure comprising rails that extend in the longitudinal direction, wherein the rollers are positioned on the rails.

A twenty-second A22 aspect includes the glass manufacturing apparatus of the twenty-first aspect A21, further comprising an expansion assist member configured to apply a force to the glass fining module in the longitudinal direction when the glass fining module is heated to an operating temperature.

A twenty-third aspect A23 includes the glass manufacturing apparatus of any of the first through twenty-second aspects A1-A22, further comprising a supportive structure at least partially surrounding the glass fining module, the supportive structure comprising a hanger vertically supporting a component of the glass fining module.

A twenty-fourth A24 aspect includes the glass manufacturing apparatus of the twenty-third aspect A23, wherein the hanger is coupled to a trolley adapted to translate in the longitudinal direction and allow for movement of the hanger relative to the supportive structure.

A twenty-fifth aspect A25 includes a glass manufacturing apparatus comprising a plurality of glass fining modules, each glass fining module comprising: a refractory metal vessel having a length extending in a longitudinal direction; a plurality of conductor flanges coupled to the refractory metal vessel, the plurality of conductor flanges circumscribing an exterior of the refractory metal vessel and positioned at opposite longitudinal ends of the refractory metal vessel; a plurality of insulation layers surrounding at least a portion of the refractory metal vessel, the plurality of insulation layers comprising: an insulation structure comprising a plurality of arched portions; a bulk insulation structure surrounding the insulation structure; and an exterior support structure at least partially surrounding the plurality of insulation layers, wherein the refractory metal vessel of sequential glass fining modules of the plurality of glass fining modules are maintained at different operating temperatures.

A twenty-sixth aspect A26 includes the glass manufacturing apparatus of the twenty-fifth aspect A25, wherein each glass fining module of the plurality of glass fining modules comprises rollers coupled to the exterior support structure such that each glass fining module is translatable in the longitudinal direction on the rollers.

A twenty-seventh aspect A27 includes a glass manufacturing apparatus of any of the twenty-fifth through twenty-sixth aspects A25-A26, wherein the exterior support structure of each glass fining module of the plurality of glass fining modules comprises: vertical tie supports extending in a vertical direction; lateral tie supports extending in a lateral direction and coupled to the vertical tie supports with springs configured to apply a first force in the vertical direction of the plurality of insulation layers; and longitudinal tie supports extending in the longitudinal direction and coupled to the vertical tie supports with springs that apply a second force in the lateral direction to the plurality of insulation layers.

A twenty-eighth aspect A28 includes a glass manufacturing apparatus of any of the twenty-fifth through twenty-seventh aspects A25-A27, wherein the refractory metal vessel of each glass fining module of the plurality of glass fining modules are joined as a continuous refractory metal vessel extending through the plurality of glass fining modules.

A twenty-ninth aspect A29 includes a glass manufacturing apparatus comprising: a continuous refractory metal vessel comprising a length extending in a longitudinal direction, the continuous refractory metal vessel comprising a plurality of stiffening ribs arranged along an outer diameter of the continuous refractory metal vessel and oriented perpendicular to the continuous refractory metal vessel; conductor flanges electrically coupled to the continuous refractory metal vessel, the conductor flanges circumscribing an exterior surface of the continuous refractory metal vessel; a plurality of glass fining modules through which the continuous refractory metal vessel extends, each glass fining module of the plurality of glass fining modules comprising: a plurality of insulation layers surrounding at least a portion of the continuous refractory metal vessel, the plurality of insulation layers comprising: an insulation structure comprising a plurality of arched portions; and a bulk insulation structure surrounding the insulation structure; and an exterior support structure at least partially surrounding the plurality of insulation layers.

A thirtieth aspect A30 includes a glass manufacturing apparatus of the twenty-ninth aspect A29, wherein each of the plurality of glass fining modules further comprises a plurality of relief regions positioned between the plurality of arched portions of the insulation structure.

A thirty-first aspect A31 includes the glass manufacturing apparatus of the thirtieth aspect A30, wherein the plurality of stiffening ribs are positioned in corresponding relief regions of the insulation structure.

A thirty-second aspect A32 includes the glass manufacturing apparatus of the thirtieth aspect A30 or the thirty-first aspect A31, wherein the plurality of relief regions are spaced apart from the at least one stiffening rib of the continuous refractory metal vessel.

A thirty-third aspect A33 includes the glass manufacturing apparatus of any of the thirtieth through thirty-second aspects A30-A32, wherein the plurality of stiffening ribs extend from an upper portion of the continuous refractory metal vessel.

A thirty-fourth aspect A34 includes the glass manufacturing apparatus of any of the thirtieth through thirty-third aspects A30-A33, wherein the continuous refractory metal vessel comprises a plurality of end plates coupled to the plurality of stiffening ribs.

A thirty-fifth aspect A34 includes the glass manufacturing apparatus of any of the twenty-ninth through thirty-fourth aspects A29-A34, wherein at least a portion of the continuous refractory metal vessel is spaced apart from the insulation structures of the plurality of glass fining modules when the plurality of glass fining modules are at room temperature.

A thirty-sixth aspect A36 includes the glass manufacturing apparatus of the thirty-fifth aspect A35, wherein the continuous refractory metal vessel is in contact with the insulation structures of the plurality of glass fining modules when the plurality of glass fining modules are at an operating temperature.

It is to be understood that both the foregoing general description and the following detailed description are merely exemplary, and are intended to provide an overview or framework to understanding the nature and character of the claimed subject matter. The accompanying drawings are included to provide a further understanding and are incorporated in and constitute a part of this specification. The drawings illustrate one or more embodiment(s), and together with the description, serve to explain principles and operation of the various embodiments.

DETAILED DESCRIPTION

Figure 1:
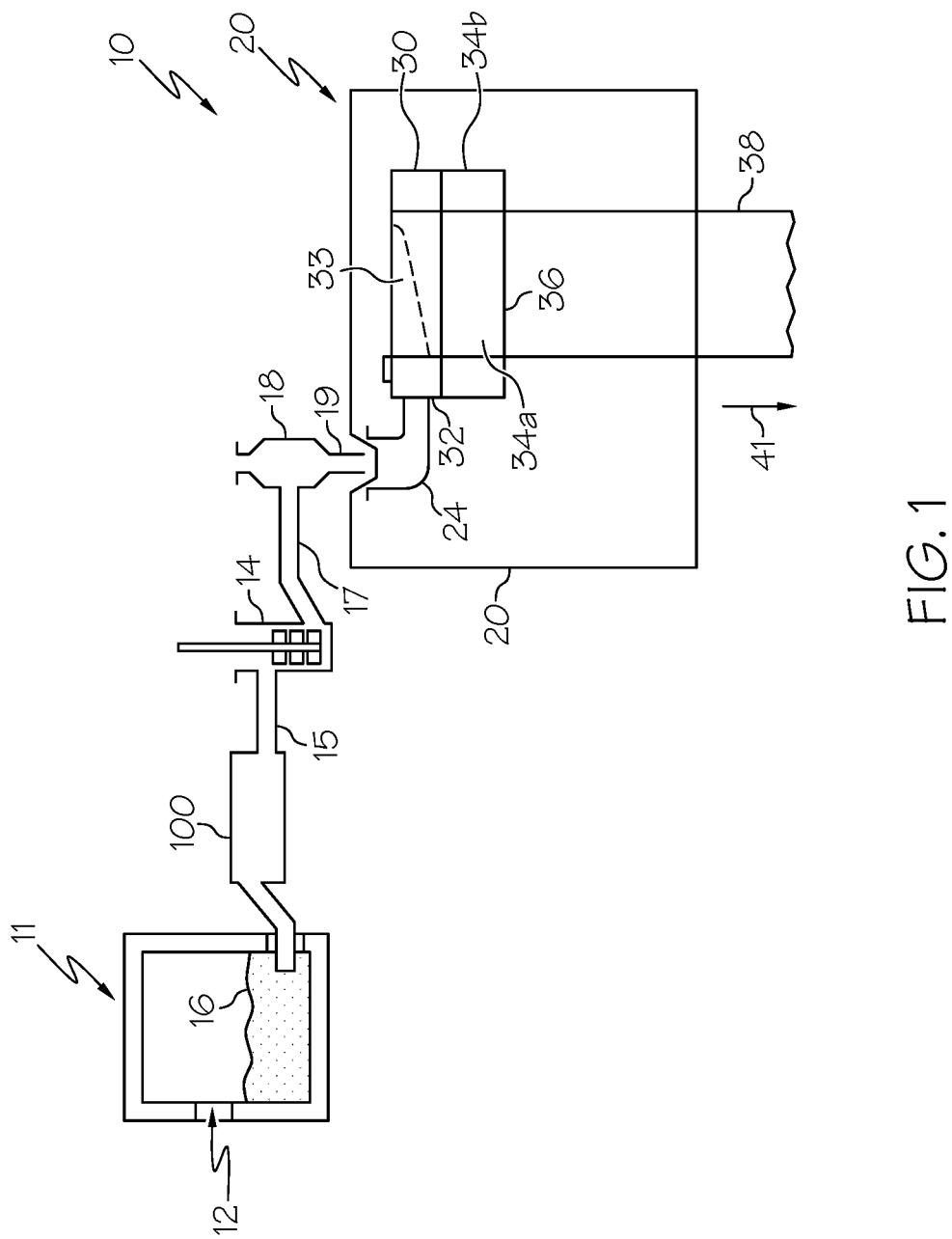
FIG. 1 schematically depicts a glass manufacturing apparatus according to one or more embodiments shown and described herein.

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments.

A glass manufacturing apparatus may include a glass fining module. The glass fining module may include a refractory metal vessel comprising a length extending in a longitudinal direction. A plurality of insulation layers may surround at least a portion of the refractory metal vessel. The plurality of insulation layers may comprise an insulation structure extending around at least a portion of the refractory metal vessel and comprising a plurality of arched portions and a bulk insulation structure surrounding the insulation structure. An exterior support structure may at least partially surround the plurality of insulation layers. Rollers may be coupled to the exterior support structure such that the glass fining module is translatable in the longitudinal direction on the rollers.

Referring to FIG. 1 by way of example, an embodiment of a glass manufacturing apparatus 10 for forming glass articles from molten glass is schematically depicted. The glass manufacturing apparatus 10 includes a melter 11, a glass fining system 100, a mixing vessel 14, a delivery vessel 18, and a forming apparatus 20. Glass batch materials are introduced into the melter 11 through a batch inlet port 12. The batch material is melted in the melter to form molten glass 16. The glass fining system 100 comprises a high temperature processing area that receives the molten glass 16 from the melter 11 and in which dissolved gasses and/or bubbles are removed from the molten glass 16. The glass fining system 100 is fluidly coupled to the mixing vessel 14 by a connecting tube 15. That is, molten glass flowing from the glass fining system 100 to the mixing vessel 14 flows through the connecting tube 15. The mixing vessel 14 is, in turn, fluidly coupled to the delivery vessel 18 by a connecting tube 17 such that molten glass flowing from the mixing vessel 14 to the delivery vessel 18 flows through the connecting tube 17.

The delivery vessel 18 supplies the molten glass 16 through a downcomer 19 into the forming apparatus 20. The forming apparatus 20 may be, for example and without limitation, a fusion draw machine or another forming apparatus for forming molten glass into a glass article such as ribbons, tubes, boules, or the like. In the embodiment depicted in FIG. 1 the forming apparatus 20 is a fusion draw machine that comprises an enclosure 22 in which an inlet 24 and a forming vessel 30 are positioned. As shown in FIG. 1, the molten glass 16 from the downcomer 19 flows into an inlet 24 which leads to the forming vessel 30. The forming vessel 30 includes an opening 32 that receives the molten glass 16 which flows into a trough 33 and then overflows and runs down two converging sides 34a and 34b of the forming vessel 30 before fusing together at a root 36 of the forming vessel 30, where the two sides join, before being contacted and drawn in a downstream direction 41 to form a continuous glass ribbon 38.

While FIG. 1 schematically depicts a glass manufacturing apparatus 10 for forming glass ribbon using a fusion draw machine, it should be understood that other processes may be used to form the glass ribbon, including, without limitation, the float glass process, the slot draw process or the like. Further, while the glass manufacturing apparatus 10 is depicted as being used for forming glass ribbon, it should be understood that similar glass manufacturing apparatuses may be used for forming glass stock material other than glass sheets including, without limitation, glass tubes and the like.

Elements of the glass fining system 100 of the glass manufacturing apparatus 10 are generally built at room temperature and operate in a glass fining process at elevated temperatures. Bringing the elements of the glass fining system to their operating temperatures increases the dimensional size of the elements according to their coefficients of thermal expansion. Because of the high operating temperatures of the refractory metal vessel in the glass fining process, even low levels of stress that are induced into the refractory metal vessel may cause creep of the refractory metal vessel, which may reduce the usable life of the refractory metal vessel. Using conventional glass fining systems, the length and/or cross-sectional diameter of the refractory metal vessel may be limited by the stress that is introduced to the refractory metal vessel.

Disclosed herein are glass manufacturing apparatuses which include modular glass fining systems. The modular glass fining systems according to the present disclosure include elements that mitigate the stress in the refractory metal vessel, which may allow for longer lengths, larger cross-sectional diameters, and or higher operating temperatures of the resulting assembled refractory metal vessel. Such modular glass fining systems may allow for increased throughput of molten glass through the modular glass fining systems and the glass manufacturing apparatuses comprising the same.

In conventional glass fining operations, a fining agent, typically arsenic oxide ($As_2O_5$), antimony oxide ($Sb_2O_3$), or tin oxide ($SnO_2$), is included in the glass batch materials that are melted and turned into molten glass at a high temperature. The fining agent undergoes a reducing reaction that releases oxygen from the fining agent. The released oxygen from the fining agent coalesces with bubbles in the molten glass, and liberates the bubbles from the molten glass. During this process, other gasses entrained in the molten glass may also diffuse into the bubbles due to the low partial pressure with the bubble. In this manner the other gasses are also liberated from the molten glass.

In general, an increase in temperature of the molten glass increases the efficacy of the fining process in growing bubbles in the molten glass that coalesce with the released oxygen from the fining agent and are of sufficient size to rise to the surface of the molten glass. However, an increase in temperature of the molten glass corresponds to an increase in temperature of the refractory metal vessel in which the fining process occurs. Increases in temperature of the refractory metal vessel may correspond to an increase in stresses of the refractory metal vessel because of the greater difference in the expansion of contacting components. Increases in temperature of the refractory metal vessel may also decrease the creep life of the refractory metal vessel.

Further, it may be desired to increase the flow rate of the molten glass in the glass fining system in order to increase the throughput of the glass fining operation. However, to maintain the dwell time of the molten glass within the fining system with the increased flow rate may necessitate increasing the length of the glass fining system and/or an increasing the cross-sectional diameter of the refractory metal vessel of the glass fining system. Longer lengths and/or larger cross-sectional diameters, however, may lead to an increase in stress in the glass fining system and/or the refractory metal vessel of the glass fining system. Again, higher stresses in the refractory metal vessel may reduce the usable life of the refractory metal vessel.

In order to mitigate such a decrease in usable life of the refractory metal vessel, glass fining systems according to the present disclosure can incorporate elements that reduce the stresses that are imparted into the refractory metal vessel as the refractory metal vessel is heated from room temperature to operational temperatures and while held at operational temperatures. Incorporation of such elements into the glass fining systems may also allow for increases in the operational temperature of the glass fining system and/or increases in the size of the glass fining system, in particular the overall length and/or the cross-section diameter of the refractory metal vessel as compared to conventional glass fining systems. In general for conventional glass fining systems, as the operating temperature of the glass fining system increases, stresses in the components of the glass fining system increase. Further, as the overall length of the glass fining system increases and/or cross-sectional diameter of the refractor metal vessel portion of the glass fining system increases, cumulative growth of the glass fining system tends to increase, thereby increasing stress associated with longitudinal growth of the glass fining system and/or radial growth of the refractory metal vessel. Embodiments of the glass fining systems according to the present disclosure include elements that reduce the stresses imparted to the refractory metal vessel, which may result in increased usable life of the refractory metal vessel.

Figure 2:
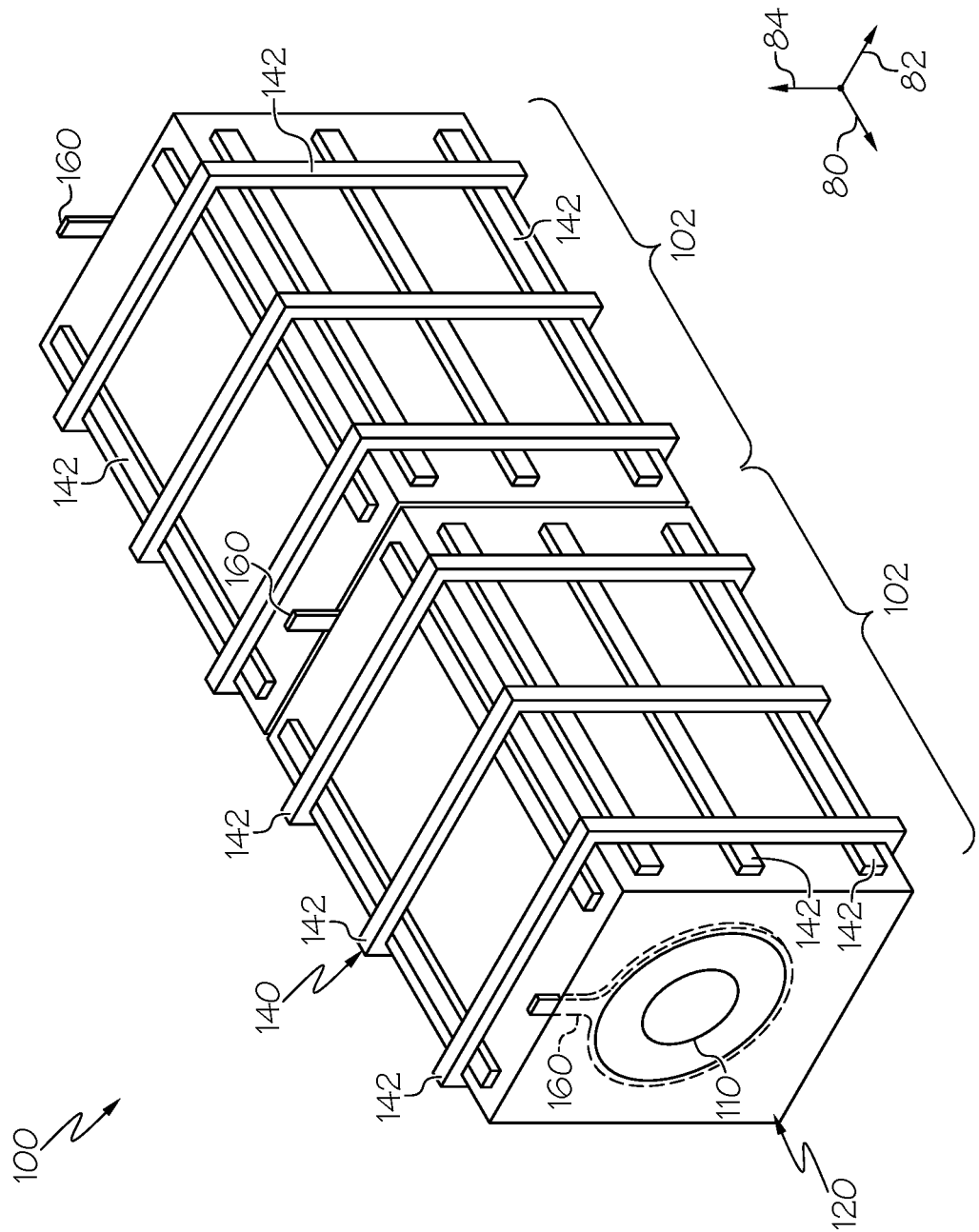
FIG. 2 is a perspective view of a glass fining system according to one or more embodiments shown or described herein.

Referring now to FIG. 2, a glass fining system 100 is depicted. In the embodiments described herein, the glass fining system 100 comprises a plurality of glass fining modules 102. Each glass fining module 102 comprises a refractory metal vessel 110 that is positioned within a plurality of insulation layers 120. The plurality of insulation layers 120 may be maintained in position by an exterior support structure 140. The exterior support structure 140 may include a plurality of tie supports 142 that apply force to the plurality of insulation layers 120 that maintains contact between the plurality of insulation layers 120, thereby maintaining the respective positioning of the refractory metal vessel 110 and the plurality of insulation layers 120 throughout the heating and cooling cycles of the glass fining system 100. The embodiment of the glass fining system 100 depicted in FIG. 2 shows two glass fining modules 102. However, it should be understood that the glass fining system 100 can have as many glass fining modules 102, of any cross section and length, to satisfy the flow and temperature processing needs of the molten glass.

Figure 3:
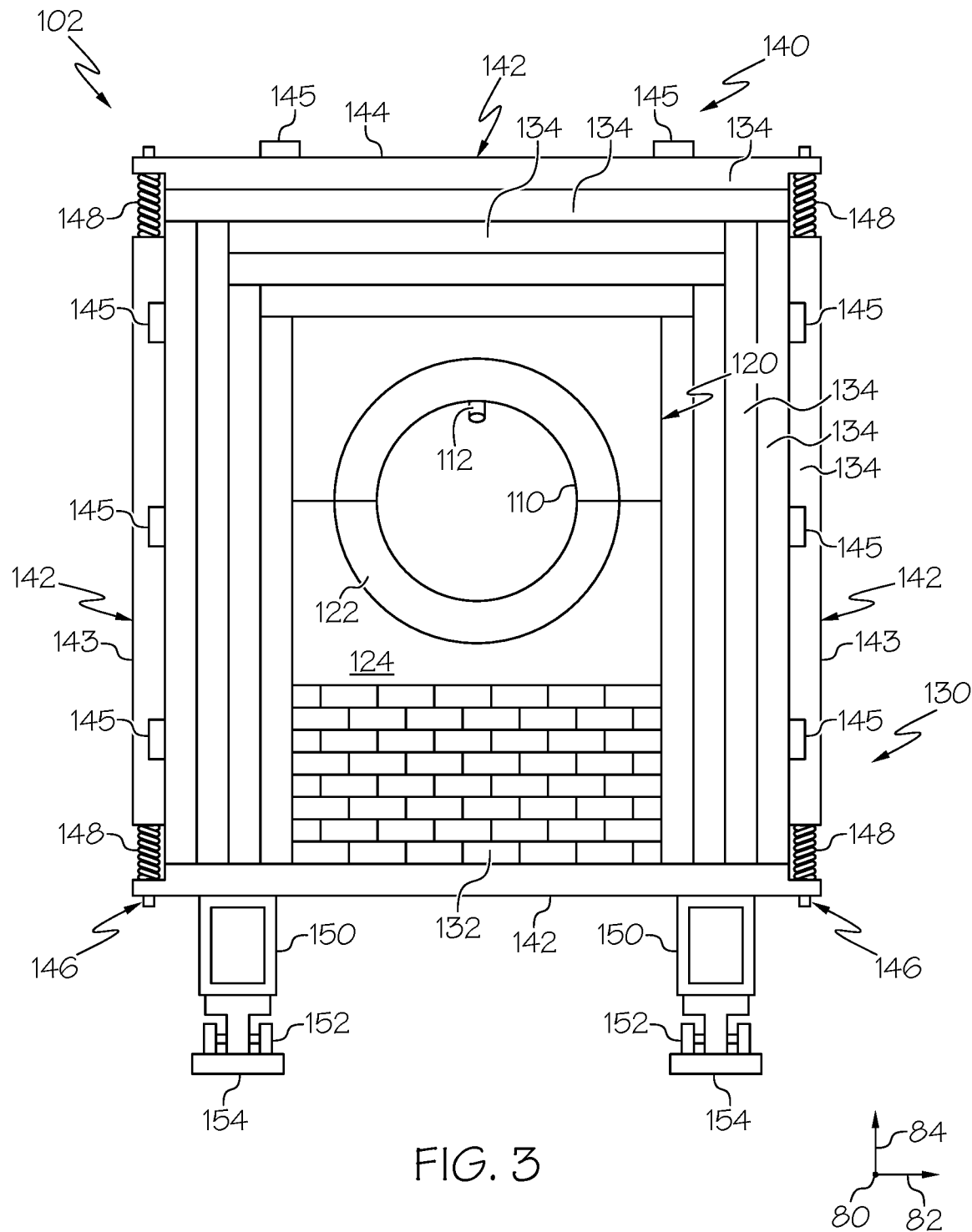
FIG. 3 is an end view of a glass fining module according to one or more embodiments shown or described herein.

Referring to FIG. 3, an end view of one embodiment of a glass fining module 102 is depicted in which the refractory metal vessel 110 generally exhibits a cylindrical interior cross-sectional shape. However, it should be understood that other cross-sectional shapes are contemplated and possible without departing from the scope of the present disclosure, including elliptical or elongated circular cross-sections.

The refractory metal vessel 110 may be made from a variety of materials that are capable of being subjected to elevated temperatures without corrosion. Examples of such materials include, without limitation, platinum, gold, molybdenum, palladium, rhodium, iridium, rhenium, tantalum, titanium, tungsten, and alloys thereof. The refractory metal vessel 110 may be held at elevated temperatures for extended durations of time, including being held at temperatures from about 1400° C. to 2000° C.

A gas vent 112 or finer vent may pass through the walls of the refractory metal vessel 110 and open into an interior space of the refractory metal vessel 110. The gas vent 112 may allow for fluid communication of the interior of the refractory metal vessel 110 with the surrounding environment, and may allow for the exhaust of gaseous byproducts of the molten glass from the interior space of the refractory metal vessel 110 to the surrounding environment.

As described above, the refractory metal vessel 110 is surrounded by a plurality of insulation layers 120. The plurality of insulation layers 120 may include an insulation structure 122 that encircles and is in direct contact with the refractory metal vessel 110 and a plurality of bulk insulation structures 130 that surround the insulation structure 122 and are separated from contact with the refractory metal vessel 110 by the insulation structure 122.

The insulation structure 122 may be selected to be a material that is a good thermal insulator to maintain the temperature of the refractory metal vessel 110 and the molten glass that passes within the refractory metal vessel 110. In some embodiments, the insulation structure 122 has a coefficient of thermal expansion (both linear and volumetric) that is close to the coefficient of thermal expansion of the refractory metal vessel 110. Minimizing the difference in thermal expansion between the refractory metal vessel 110 and the insulation structure 122 may reduce stresses that are imparted onto the refractory metal vessel 110 due to mismatches in the thermal expansion of the different layers of materials that form the glass fining module 102.

In embodiment depicted in FIG. 3, the insulation structure 122 may be positioned inside a cradle 124. The cradle 124 may be sized to generally accommodate the exterior surfaces of the insulation structure 122, such that the cradle 124 provides support and locates the insulation structure 122, and therefore the refractory metal vessel 110, within the plurality of insulation layers 120.

In some embodiments, at least one of the insulation structure 122 and the cradle 124 may be made from a ceramic material, for example and without limitation, a partially stabilized zirconium oxide material or a fully stabilized zirconium oxide material. In some embodiments, at least one of the insulation structure 122 or the cradle 124 can also be made as a combination of a partially stabilized and a fully stabilized zirconia material. For example and without limitation, the insulation structure 122 may comprise a fully stabilized zirconia material and the cradle 124 may comprise a partially stabilized zirconia material. Such zirconia materials may be stabilized to prevent cracking at high temperatures due to thermal stresses developed, for example, during the heat up to operation conditions from room temperature, and may exhibit a coefficient of thermal expansion that has a small difference as compared to the coefficient of thermal expansion of the refractory metal vessel 110.

In various embodiments, the glass fining module 102 may further comprise a bulk insulation structure 130 that surrounds the insulation structure 122 and provides support for the refractory metal vessel 110 and the insulation structure 122. The bulk insulation structures 130 may be made from a variety of acceptable insulating materials having the ability to be maintained at elevated temperatures without degradation and mechanical failure such as by cracking. At positions below the insulation structure 122 and the cradle 124, an assembly of support bricks 132 may be arranged. The support bricks 132 may be made from, for example and without limitation, insulating firebrick such as IFB 3000, IFB 2800, IFB 2600, or IFB 2300. In general, such materials exhibit high crush strength at the operational temperatures of the support bricks 132.

The bulk insulation structures 130 may also include a plurality of insulation panels 134 that are positioned on top of and along the sides of the cradle 124. The insulation panels 134 may be made from, for example and without limitation, Duraboard® 3000, Duraboard® 2600, Duraboard® 2300, Duraboard® LD.

The selection of materials for the bulk insulation structure 130 and their arrangement in the bulk insulation structures 130 may be selected to provide the desired heat loss from the molten glass. In some embodiments, the materials of the bulk insulation structures 130 may be selected and arranged to provide a maximum effective heat thermal conductivity of about 3 W/m·K. Lower values of effective thermal conductivity may reduce the amount of heat that is directed into the refractory metal vessel 110, and may reduce local variations in temperature of elements of the glass fining system 100.

As discussed hereinabove, the glass fining module 102 includes an exterior support structure 140 that surrounds the bulk insulation structures 130. The exterior support structure 140 comprises a plurality of tie supports 142 that apply force to the plurality of insulation layers 120 to maintain contact between the plurality of insulation layers 120, thereby maintaining the respective positioning of the refractory metal vessel 110 and the plurality of insulation layers 120 throughout the heating and cooling cycles of the glass fining system 100. The tie supports 142 include vertical tie supports 143 that extend in a vertical direction 84, lateral tie supports 144 that extend in a lateral direction 82 perpendicular to the vertical direction, and longitudinal tie supports 145 that extend in a longitudinal direction 80 (i.e., the length direction) of the refractory metal vessel 110. The tie supports 142 are coupled to one another. The tie supports 142 are typically configured to be held in compression throughout the heating and cooling cycles of the glass fining module 102. As the glass fining module 102 is heated from room temperature to an operating temperature, elements of the glass fining module 102 exhibit thermal expansion. Such expansion of heated components may induce additional tension into components that expand less than surrounding components. To accommodate such variation in the expansion of the components, coupling of the tie supports 142 may comprise springs 148 that allow for variation in the thermal expansion of the plurality of insulation layers 120 relative to the tie supports 142. The springs 148 can be positioned between the tie supports 142 to accommodate expansion of the plurality of insulation layers 120 in the vertical and transverse directions and maintain a force on the plurality of insulation layers 120. The springs 148 may be positioned between joined tie supports on threaded rods (not shown) located at the ends of the tie supports 142 and secured in place with nuts (not shown) threaded on to the threaded rods.

In various embodiments, the exterior support structure 140 of the glass fining module 102 may further include a support base 150 that is coupled to the tie supports 142. The support base 150 may extend in the longitudinal direction 80 and in the lateral direction 82 that is transverse to the longitudinal direction 80 of the coordinate axes depicted in FIG. 3. In some embodiments, the support base 150 may be coupled to a plurality of rollers 152. In the embodiment depicted in FIG. 3, the plurality of rollers 152 may be in contact with rails 154 such that the plurality of rollers 152 can roll along the corresponding rails 154. Accordingly, the rollers 152 allow the glass fining module 102 to translate in the longitudinal direction 80. In one example, as the glass fining modules 102 are heated from room temperature to their operating temperature, the components of the glass fining modules 102 may expand. The glass fining modules 102 may be translated in the longitudinal direction 80 to accommodate expansion of the components (i.e., the refractory metal vessel 110), thereby minimizing stress imparted to the components of the glass fining module 102 due to thermal expansion.

In embodiments, each glass fining module 102 of the glass fining system 100 can include rollers 152, which facilitate independent movement of the glass fining modules 102 relative to one another. For example, the operating temperatures of sequential glass fining modules 102 may vary from one another. Accordingly, the longitudinal expansion of the glass fining modules 102 may vary from one another. In embodiments wherein each glass fining module 102 includes rollers 152 allowing for the glass fining modules 102 to be translated in the longitudinal direction 80, the glass fining modules 102 may be positioned to accommodate the respective longitudinal thermal expansion of, for example, the refractory metal vessel 110, according to the parameters of the glass fining operation. Allowing the glass fining modules 102 to translate with minimal restriction may reduce stress that is introduced to the refractory metal vessel 110 by thermal expansion of the various components of the glass fining system. Further, allowing the glass fining modules 102 to translate with minimal restriction may also allow for the coupled glass fining modules 102 to be positioned to enhance operation of the system. For example, the glass fining modules 102 may be positioned to minimize spacing between glass manufacturing equipment upstream and downstream of the glass fining system, thereby minimizing lengths of transition hardware, which may improve life and/or reliability of the glass manufacturing equipment, including the glass fining system.

Figure 4:
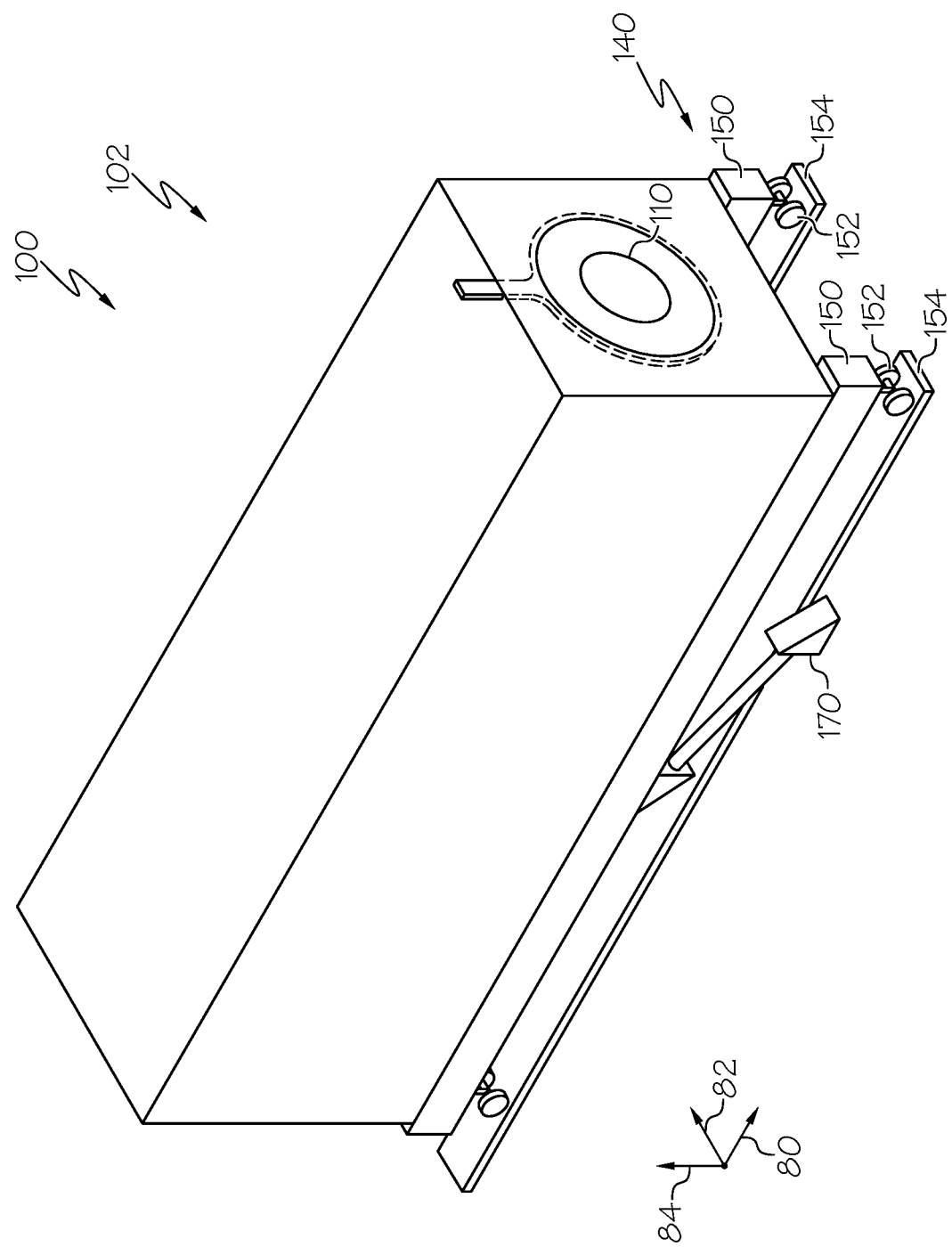
FIG. 4 is a perspective view of a glass fining module according to one or more embodiments shown or described herein.

Referring now to FIG. 4, one or more glass fining modules 102 of the glass fining system 100 may also include an expansion assist member 170 that is positioned proximate to a rail 154. The expansion assist member 170 contacts the exterior support structure 140 and/or the support base 150 of the one or more glass fining modules 102. The expansion assist member 170 can be configured to apply a force to a glass fining module 102 in the longitudinal direction 80 at an orientation that corresponds to translation of the glass fining module 102 along the rails 154 when the glass fining system 100 is heated from room temperature to its operating temperature. The force applied by the expansion assist member 170 may direct the expansion movement of the glass fining module 102, thereby reducing the stress induced in the refractory metal vessel 110 by thermal expansion of the glass fining system components. The expansion assist member 170 can be adjusted to apply a predetermined force based on the length, cross section, and target operating temperature of the one or more glass fining modules 102 of the glass fining system 100.

Figure 5:
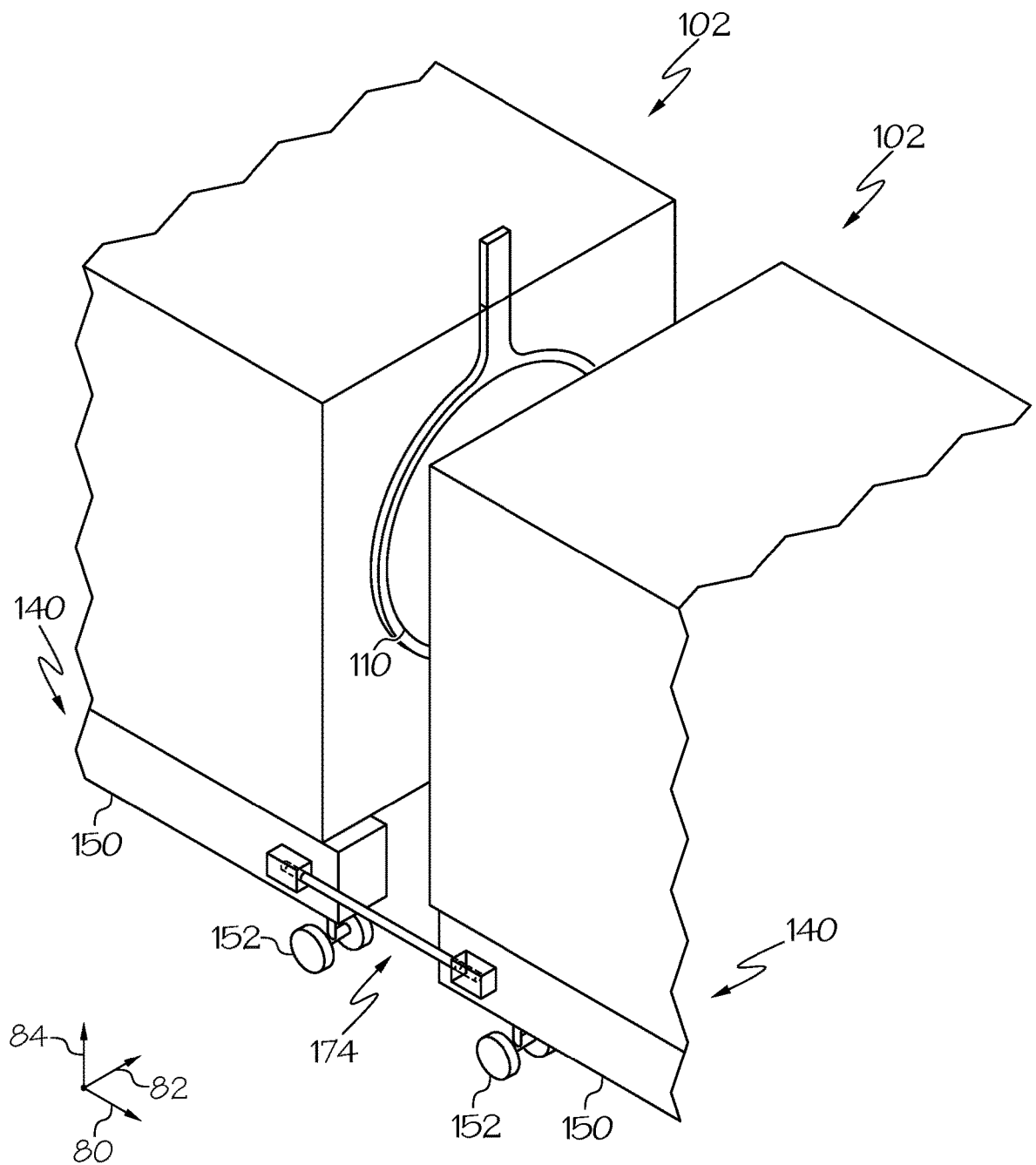
FIG. 5 is a perspective view of a glass fining module according to one or more embodiments shown or described herein.

Referring now to FIG. 5, the glass fining system 100 may also include a tie rod 174 that selectively couples adjacent glass fining modules 102 to one another. In one embodiment, the tie rod 174 may be removed from between the adjacent glass fining modules 102 as the glass fining system 100 is heated from room temperature to its operating temperature. Once the temperature in the glass fining system 100 has stabilized at its operating temperature, the tie rod 174 may be replaced between the sequential glass fining modules 102 and secured, for example by contacting the exterior support structure 140, including the support base 150, to maintain a predetermined distance between the adjacent glass fining modules 102 and to reduce stress applied to the refractory metal vessel 110 in the longitudinal direction 80 by minimizing variation in spacing between the adjacent glass fining modules 102. Once engaged, tie rods 174 can couple the plurality of glass fining modules to one another so they can move as a single unit along the rails 154.

Referring again to FIG. 2, the glass fining system 100 may further include at least one conductor flange 160. In embodiments described herein, the glass fining system 100 includes a plurality of conductor flanges 160. The conductor flanges 160 circumscribe the refractory metal vessel 10 and are maintained in electrical contact with an exterior surface of the refractory metal vessel 110. Electrical current is passed through the conductor flanges 160 and into the refractory metal vessel 110 to heat the refractory metal vessel 110 and the molten glass within the refractory metal vessel 110. In various embodiments, the conductor flanges 160 circumscribe at least a portion of the refractory metal vessel 110 and can be positioned at longitudinal ends of the plurality of insulation layers 120. Because of the electrical resistance of the refractory metal vessel 110, the electrical current heats the refractory metal vessel 110 directly, thereby heating the molten glass inside the refractory metal vessel 110.

Figure 6:
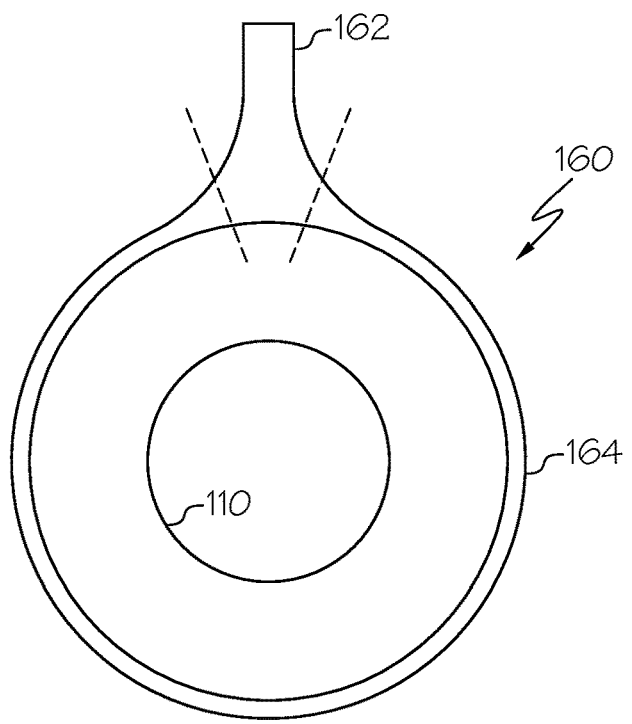
FIG. 6 is an end view of a conductor flange according to one or more embodiments shown or described herein.
Figure 7:
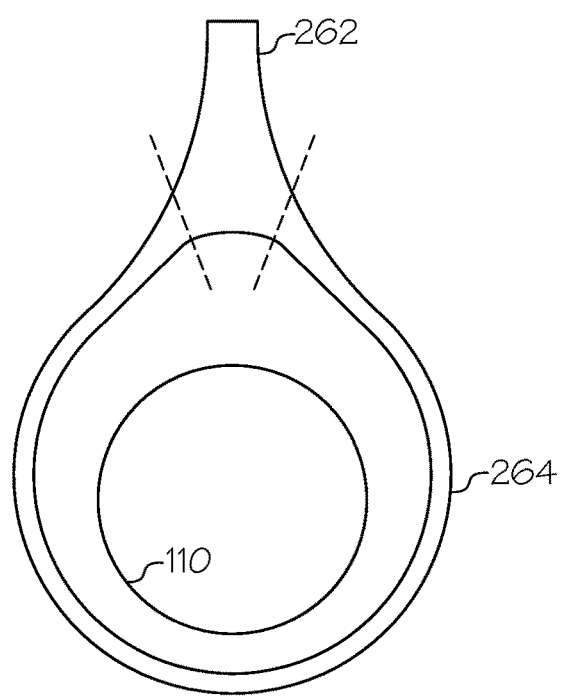
FIG. 7 is an end view of a conductor flange according to one or more embodiments shown or described herein.
Figure 8:
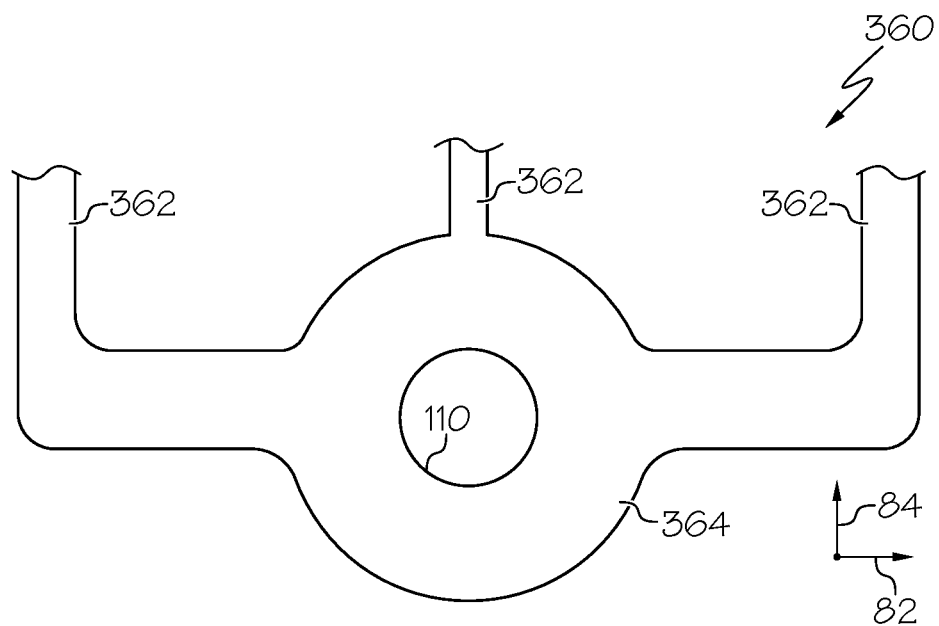
FIG. 8 is an end view of a conductor flange according to one or more embodiments shown or described herein.
Figure 9:
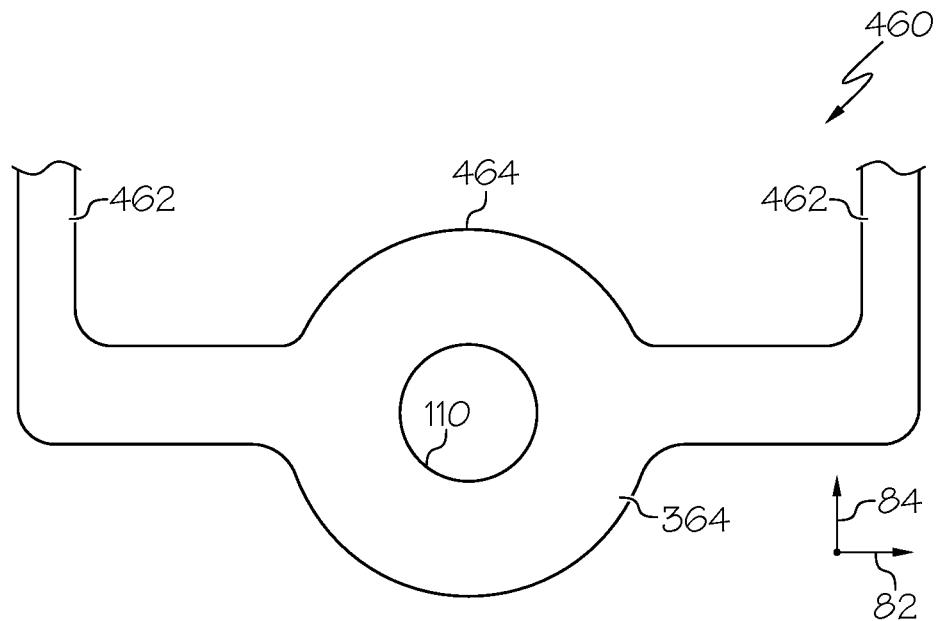
FIG. 9 is an end view of a conductor flange according to one or more embodiments shown or described herein.
Figure 10:
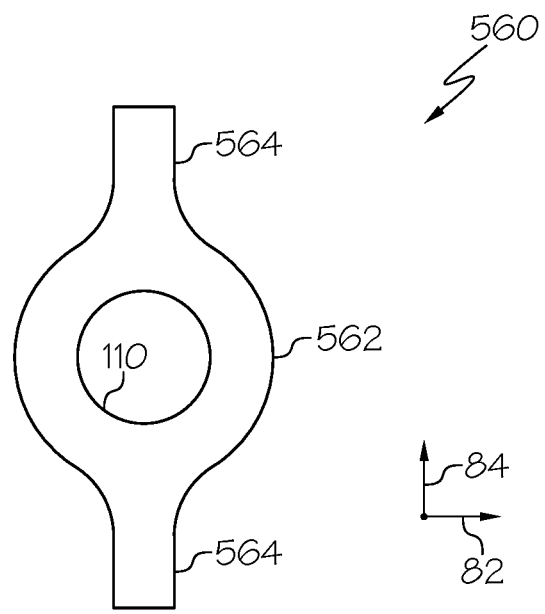
FIG. 10 is an end view of a conductor flange according to one or more embodiments shown or described herein.
Figure 11:
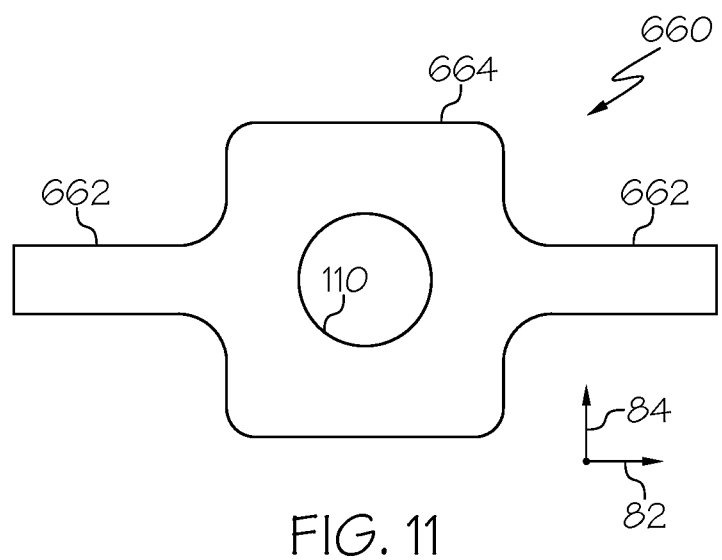
FIG. 11 is an end view of a conductor flange according to one or more embodiments shown or described herein.

The conductor flanges 160 may have a variety of shapes and configurations to direct electrical current into the refractory metal vessel 110. FIGS. 6-11 depict various embodiments of conductor flanges. Referring now to FIG. 6 by way of example, in some embodiments, the conductor flanges 160 can comprise a bus portion 162 and a distribution portion 164, where the distribution portion 164 has a uniform cross-sectional width around the refractory metal vessel 110. Referring now to FIG. 7, another embodiment of a conductor flange 260 is depicted comprising a bus portion 262 and a distribution portion 264, where the distribution portion 264 has a non-uniform cross-sectional width around the refractory metal vessel 110. FIG. 8 depicts still another embodiment of a conductor flange 360 that incorporates a plurality of bus portions 362 that extend from the distribution portion 364. FIG. 9 depicts yet another embodiment of a conductor flange 460 comprising two bus portions 462 that are positioned in a lateral direction 82 from the distribution portion 464 and extend in a vertical direction 84 for connection with electrical leads. FIG. 10 depicts another embodiment of a conductor flange 560 comprising two bus portions 562 that extend vertically and in opposite directions from the conductor flange 564. FIG. 11 depicts still another embodiment of a conductor flange 660 comprising two bus portions 662 that extend laterally and in opposite directions from the conductor flange 664 for connection with electrical leads. The various configurations of the conductor flanges 160, 260, 360, 460, 560, 660 may facilitate the introduction of electrical current into the refractory metal vessel 110 for targeted and/or high efficiency heating of the molten glass, and may be selected based on at least the magnitude of the electrical current that is being passed to the refractory metal vessel 110 and accessibility of the bus portions to connection with a current source.

The conductor flanges 160, 260, 360, 460, 560, 660 may be made from a low resistance metal, for example, a transition metal such as, without limitation, electrical grade nickel 600/601 and a high temperature refractory metal, for example and without limitation, platinum or alloys thereof that allows for higher temperatures experienced from conduction of heat from the refractory metal vessel 110. In various embodiments, the conductor flanges 160, 260, 360, 460, 560, 660 may be cooled, for example, by air cooling or water cooling. In various embodiments, cooling fluid can be directed through a cooling tube coupled to and extending around the conductor flanges 160, 260, 360, 460, 560, 660. In other embodiments, cooling fluid can be targeted to cool selected portions of the conductor flanges 160, 260, 360, 460, 560, 660.

Figure 12:
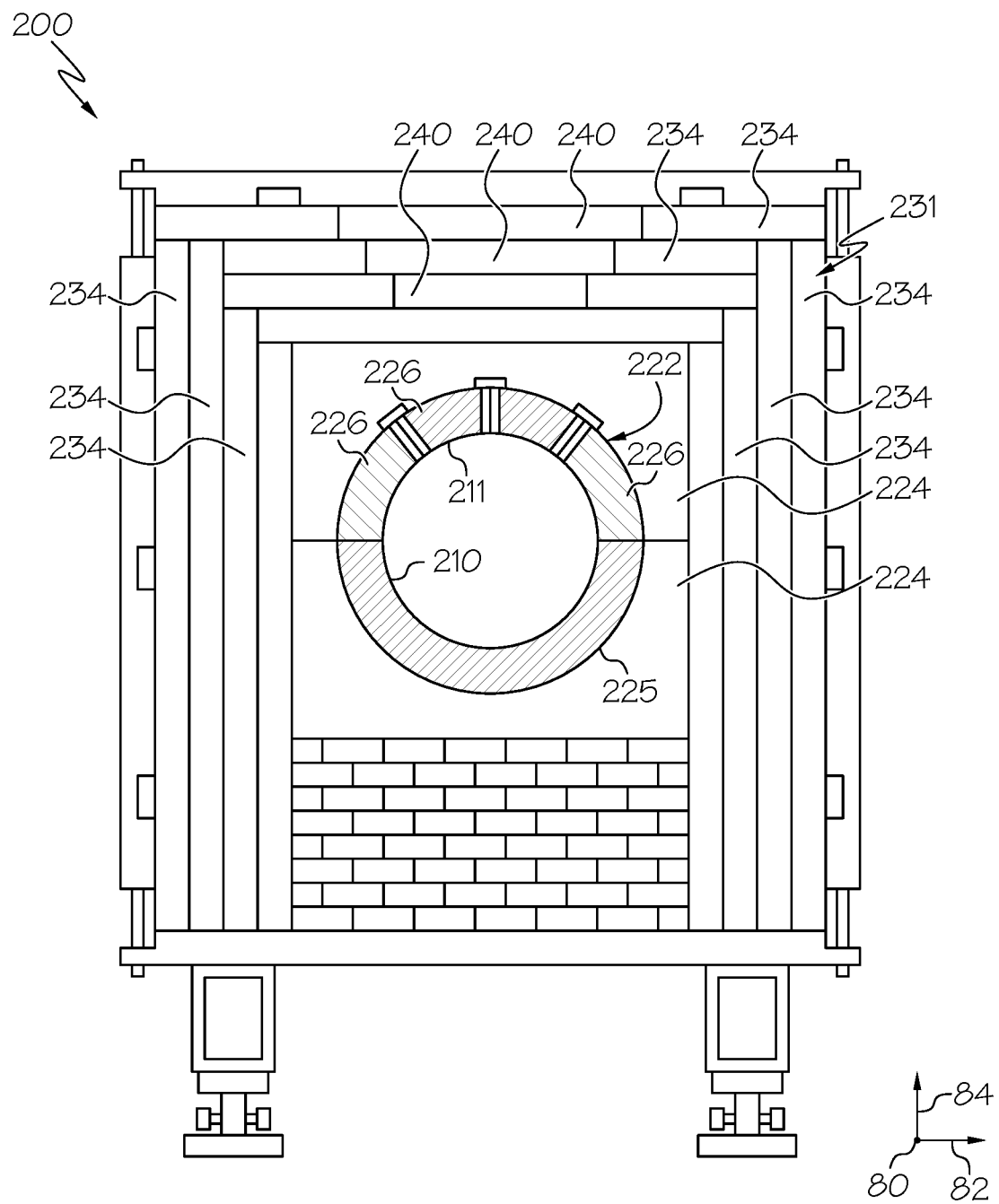
FIG. 12 is an end view of a glass fining module according to one or more embodiments shown or described herein.
Figure 13:
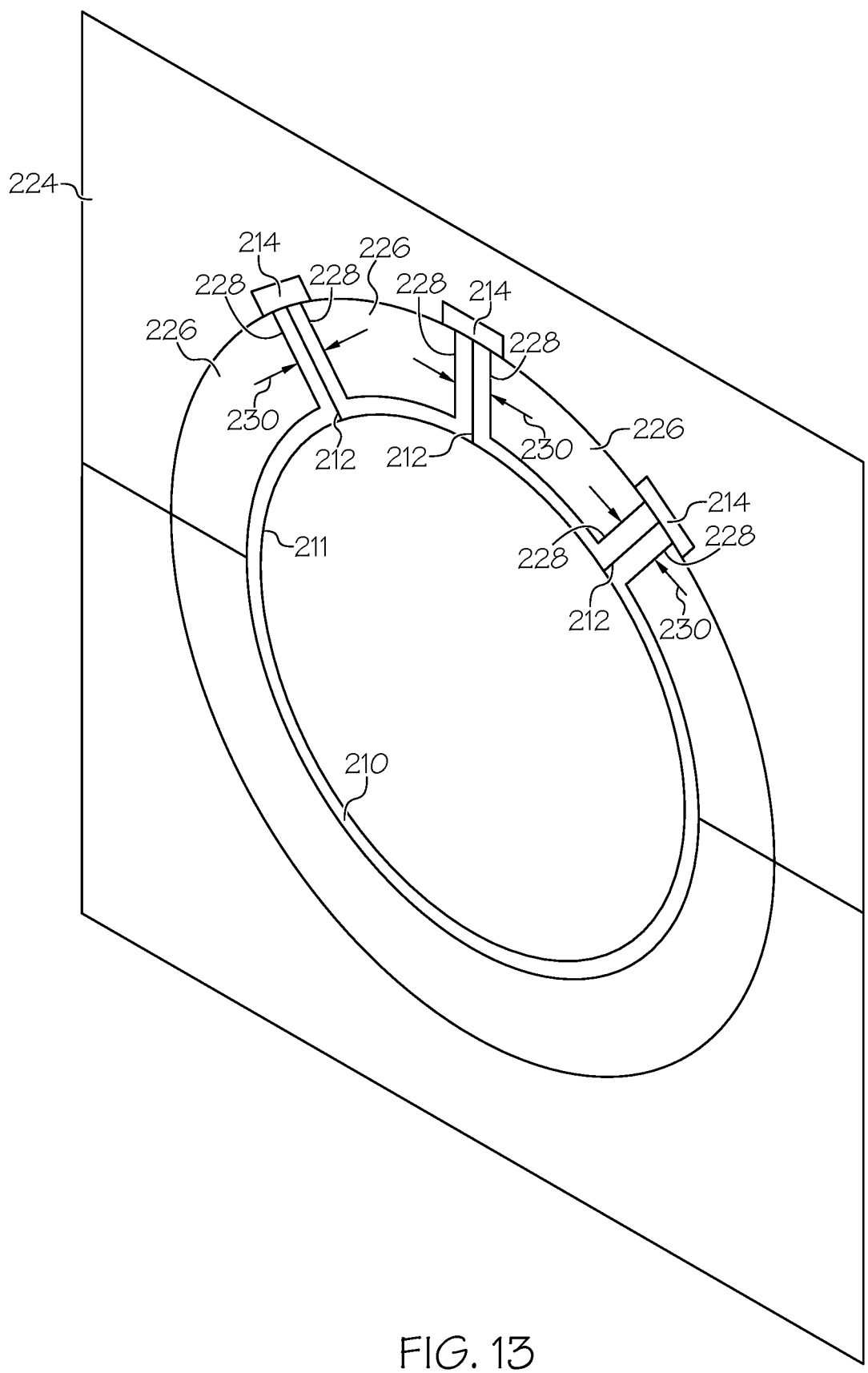
FIG. 13 is a perspective view of a glass fining module according to one or more embodiments shown or described herein.

Now referring collectively to FIGS. 12 and 13, an embodiment of a glass fining module 202 is depicted comprising a refractory metal vessel 210 that extends in a longitudinal direction 80 and an insulation structure 222 that comprises a lower tube portion 225 and a plurality of arched portions 226 that, when combined, form a generally cylindrical insulation structure 222 that surrounds and encircles the refractory metal vessel 210. The plurality of arched portions 226 may be sized in a circumferential direction such that the plurality of arched portions 226 and the lower tube portion 225 form a generally circular supportive structure as depicted in FIGS. 12 and 13. The insulation structure 222 may be positioned within a cradle 224. In various embodiments, the cradle 224 may be spaced apart from the arched portions 226, such that the arched portions 226 have freedom of movement (e.g., due to thermal expansion or contraction) before contacting the surfaces of the cradle 224. The spacing between adjacent arched portions 226 minimizes a build-up of stress in a circumferential direction of the enveloping insulation structure due to thermal expansion. That is, adjacent arched portions 226 may be spaced apart from one another by relief regions 230 (FIG. 13) to accommodate thermal expansion and thereby mitigate the development of hoop stresses in the insulation structure 222.

Referring to FIG. 13, the refractory metal vessel 210 may have at least one stiffening rib. In the embodiment shown in FIG. 13, the refractory metal vessel 210 comprises a plurality of stiffening ribs 212 extending in a generally radial orientation relative to the refractory metal vessel 210 and further extend in a longitudinal direction 80 along the refractory metal vessel 210. In some embodiments, the stiffening ribs 212 may include end plates 214 that are positioned along the ends of the stiffening ribs 212 and are generally perpendicular to the stiffening ribs 212. The stiffening ribs 212 may be positioned along the top half 211 of the refractory metal vessel 210. In some embodiments, molten glass may not fill the entire volume of the refractory metal vessel 210. Accordingly, the stiffening ribs 212 may provide additional structural support to the refractory metal vessel 210 such that the portion of the refractory metal vessel 210 that is free of contact with molten glass is able to support itself and is not subjected to a level of stress that would tend to deform, such as buckle, the refractory metal vessel 210.

The arched portions 226 of the enveloping insulation structure 222 may include contacting regions 228 that provide contact between arched portions 226 and the stiffening ribs, thereby providing the supportive structure of the insulation structure 222. The arched portions 226 may also include relief regions 230 positioned proximate to the stiffening ribs 212 of the refractory metal vessel 210. When the arched portions 226 are assembled into the insulation structure 222, the relief regions 230 provide space between adjacent arched portions 226. In some embodiments (not shown), the relief regions 230 may be spaced apart from the stiffening ribs 212 of the refractory metal vessel 210, such that the relief regions 230 do not contact the stiffening ribs 212 of the refractory metal vessel 210. That is, the stiffening ribs 212 are positioned in the relief regions 230 but do not contact the arched portions 226. The relief regions 230 may have a size that allows for free longitudinal movement of the refractory metal vessel 210 and radial expansion of the refractory metal vessel 210. That is, the relief regions 230 provide sufficient space to allow for the thermal expansion of the refractory metal vessel 210 without contact between the insulation structure 222 and the refractory metal vessel 210. In one embodiment, arched portions 226 of the insulation structure 222 are in contact with end plates 214 joined to the stiffening ribs 212 of the refractory metal vessel 210 to provide mechanical support to the refractory metal vessel 210.

The configuration of the relief regions 230 relative to the stiffening ribs 212 of the refractory metal vessel 210 may allow components of the glass fining module 202 to expand or contract based on the respective temperatures of the components without binding and without inducing high levels of stress into the refractory metal vessel 210. For example, the refractory metal vessel 210 expands circumferentially and longitudinally as the glass fining module 202 is heated from room temperature to a working temperature. The relief regions 230 between the arched portions accommodate the thermal expansion of the refractory metal vessel 210 and may result in reduced stress imparted into the refractory metal vessel 210. Such reductions in stress imparted into the refractory metal vessel 210 may allow for longer life of the refractory metal vessel 210 and/or may allow for higher temperatures or higher temperature variation within the glass fining module 202 compared to conventional designs.

In some embodiments, the enveloping insulation structure 222 may be surrounded by a bulk insulation structure 231 separated from contact with the refractory metal vessel 210. The bulk insulation structure 231 may include a plurality of insulation panels 234 with relatively low thermal conductivity such that the insulation panels maintain the temperature of the refractory metal vessel 210.

Referring again to FIG. 12, in some embodiments, the bulk insulation structure 231 may include a temperature relief region 240 that is positioned in a vertical direction 84 upward from the refractory metal vessel 210. Accordingly, the temperature relief region 240 exhibits a higher thermal conductivity that the surrounding bulk insulation structure 231. The temperature relief region 240 may prevent an over-temperature condition of the refractory metal vessel 210 by allowing heat to escape from the glass fining module 202 through the temperature relief region 240.

In embodiments, the temperature relief region 240 may be constructed from panels or bricks of a material which has greater thermal conductivity than the bulk insulation structure 231. For example, in some embodiments the temperature relief region 240 may be constructed from a ceramic material, for example and without limitation, Zedcor™.

Referring again to FIG. 2, various embodiments of the refractory metal vessel 110 and the plurality of insulation layers 120 may be combined into the glass fining system 100. In some embodiments, the glass fining system 100 may include a continuous refractory metal vessel 110 that extends continuously throughout a plurality of the glass fining modules 102, for example continuously through all of the glass fining modules 102 that form the glass fining system 100. The phrase "continuous refractory metal vessel," as used herein, means the refractory metal vessel is formed from a single length of refractory metal or several discrete segments of refractory metal joined together, such as by welding, brazing, or the like, to form a unitary vessel. In other embodiments, the glass fining system 100 may have a plurality of refractory metal vessel 110. Specifically, each glass fining module 102 may comprise a discrete refractory metal vessel 110 and the refractory metal vessel 110 of adjacent glass fining modules 102 are coupled to one another to facilitate the flow of molten glass between the refractory metal vessels 110 of each glass fining module 102. The quantity and the dimensions of glass fining modules 102 that form the glass fining system 100 may be selected to satisfy the flowrate and temperature parameters of a particular glass fining operation.

For example, in embodiments according to the present disclosure, the glass fining system 100 may include a plurality of glass fining modules 102 and a continuous refractory metal vessel 110 (rather than several discrete refractory metal vessels) that extends through the glass fining modules without intermediate seals, such as glass seals, joining discrete portions of the refractory metal vessel 110. In such embodiments, the continuous refractory metal vessel 110 is free to expand and contract relative to the plurality of glass fining modules 102 without disturbing the relative spacing between adjacent glass fining modules 102.

In other embodiments, each of the glass fining modules 102 may include a separate refractory metal vessel 110. Sequential refractory metal vessels 110 of adjacent glass fining modules 102 may be sealed to one another to facilitate glass flow from one refractory metal vessel 110 to the next. For example, in some embodiments, sequential refractory metal vessel 110 may be sealed to one another with glass seals. Specifically, in these embodiments refractory metal vessel 110 are initially positioned relative to one another and proximity coupled at joints (i.e., coupled but not sealed together). Once molten glass begins to flow through the refractory metal vessel 110, glass leaks from the joints, cools and solidifies forming a glass seal between the adjacent refractory metal vessels 110. The eventual formation of a glass seal between adjacent refractory metal vessels 110 allows for the thermal expansion of components of the glass fining modules during startup of the system without requiring a separate sealing component.

Still referring to FIG. 2, in the embodiments described herein the plurality of glass fining modules 102 include conductor flanges 160 that are in electrical contact with the external surfaces of the refractory metal vessel 110. As discussed hereinabove, electrical current may be directed through the conductor flanges 160 and the refractory metal vessel 110 thereby heating the refractory metal vessel 110. Because the glass fining system 100 includes a plurality of conductor flanges 160 in electrical contact with the refractory metal vessel 110, the electrical current that is directed into particular portions of the refractory metal vessel 110 can be varied. For example, the parameters of the glass fining process may dictate that the temperature of the molten glass within the refractory metal vessel 110 varies along the longitudinal direction 80, with some locations being relatively hotter than adjacent location while other locations being relatively cooler than adjacent locations. The multiple conductor flanges 160 associated with individual refractory metal vessel 110 of the glass fining modules 102 allows for variation in the electrical current that is directed into the refractory metal vessel 110 to accommodate the desired temperature variations in the molten glass along the length of the glass fining system 100. For example, the glass fining modules corresponding to the end portions of the glass fining system 100 may be heated to a greater temperature than the glass fining modules corresponding to the central portion of the glass fining system 100 to account for thermal losses from the molten glass as the molten glass flows into or out of the glass fining system.

In conventional glass fining systems, variations in the temperature of the refractory metal vessel may induce stress into the refractory metal vessel 110. However, because the glass fining systems according to the present disclosure includes discrete glass fining modules with elements, that allow for reduced stresses associated with expansion and contraction of the refractory metal vessel 110, such as the exterior support structure, rollers, and various insulating elements, local temperature variation within the refractory metal vessel 110 of the glass fining system 100 may not substantially decrease the life of the glass fining system 100.

Further, in embodiments of the glass fining system 100 as described herein in which the plurality of glass fining modules 102 are supported on rollers (as discussed with respect to FIG. 3), the rollers may allow the plurality of glass fining modules 102 to be repositioned in the longitudinal direction 80 with minimal stress being introduced to the refractory metal vessel 110.

Figure 14:
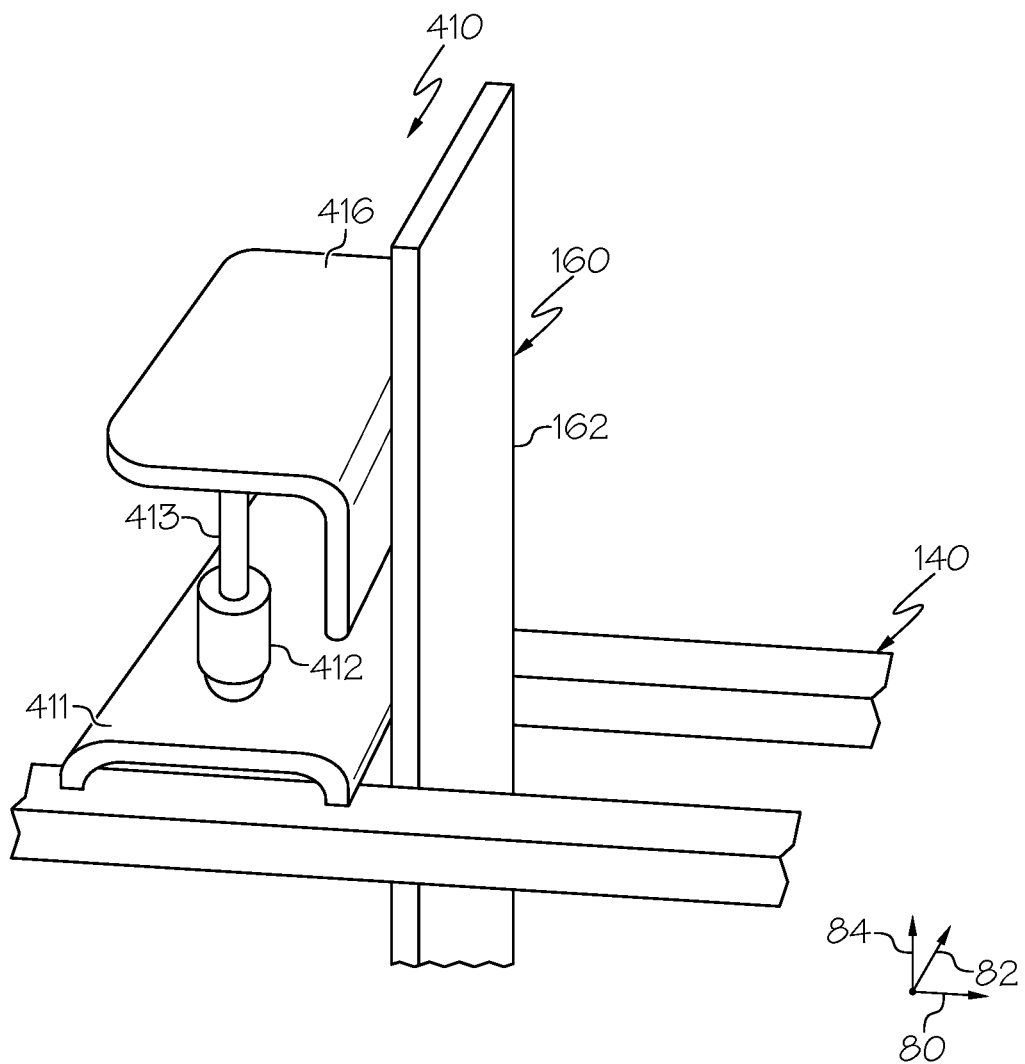
FIG. 14 is a perspective view of a glass fining module according to one or more embodiments shown or described herein.

Referring now to FIG. 14, in the embodiment depicted in FIG. 14, the conductor flanges 160 are coupled to the exterior support structure 140 by a translatable support 410. The translatable support 410 includes a body 411 coupled to the exterior support structure 140 and a coupling flange 416 that translates in the vertical direction 84 relative to the body 411. The translatable support 410 can include a spring 412 that applies an upward force to the coupling flange 416 through transfer rod 413 in contact with the coupling flange 416. Electrical insulation (not depicted) may be positioned between the transfer rod 413 and the coupling such that the coupling flange 416 and the body 411 are electrically isolated from one another. The coupling flange 416 of the translatable support 410 is biased against the bus portion 162 of the conductor flange 160 with the spring 412 and transfer rod 413. The force applied by the spring 412 counteracts load that would be induced into the refractory metal vessel 110 by the weight of the conductor flange 160.

When the refractory metal vessel 110 is brought to elevated temperatures, the refractory metal vessel expands circumferentially and longitudinally. Expansion of the refractory metal vessel changes the elevation of the conductor flange 160. The spring 412 maintains support of the conductor flange 160 throughout the temperature variation while minimizing stress that is introduced to the refractory metal vessel by the weight of the conductor flange 160. Longitudinal expansion of the refractory metal vessel changes the location of the conductor flange 160. The translatable support 410 is repositionable to accommodate the longitudinal positional change of the conductor flange 160, for example, by sliding along the exterior support structure 140 in the longitudinal direction 80, while minimizing stress that is introduced to the refractory metal vessel 110 by reducing misalignment of the translatable support 410 relative to the conductor flange 160.

Figure 15:
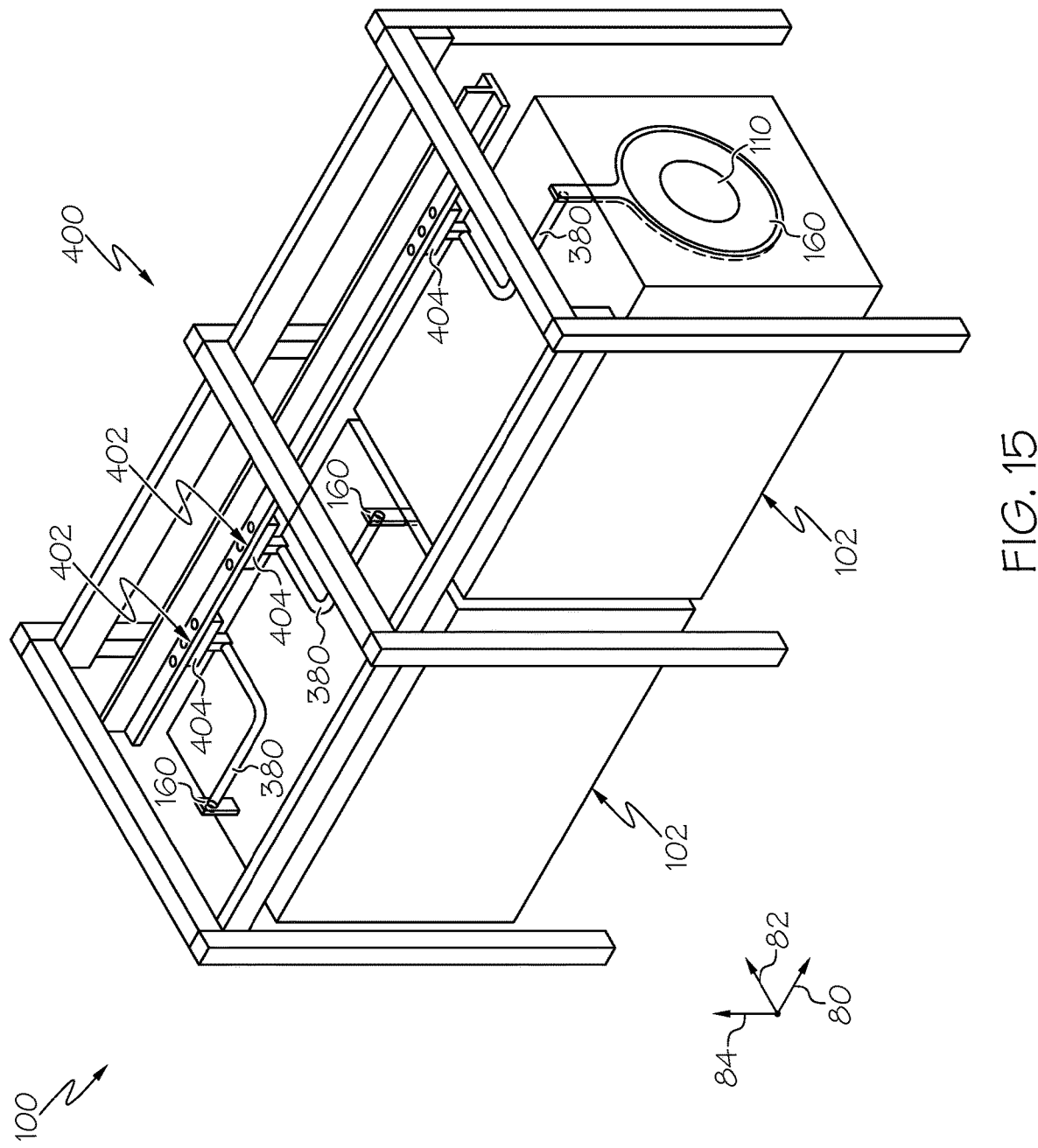
FIG. 15 is a perspective view of a glass fining system according to one or more embodiments shown or described herein.
Figure 16:
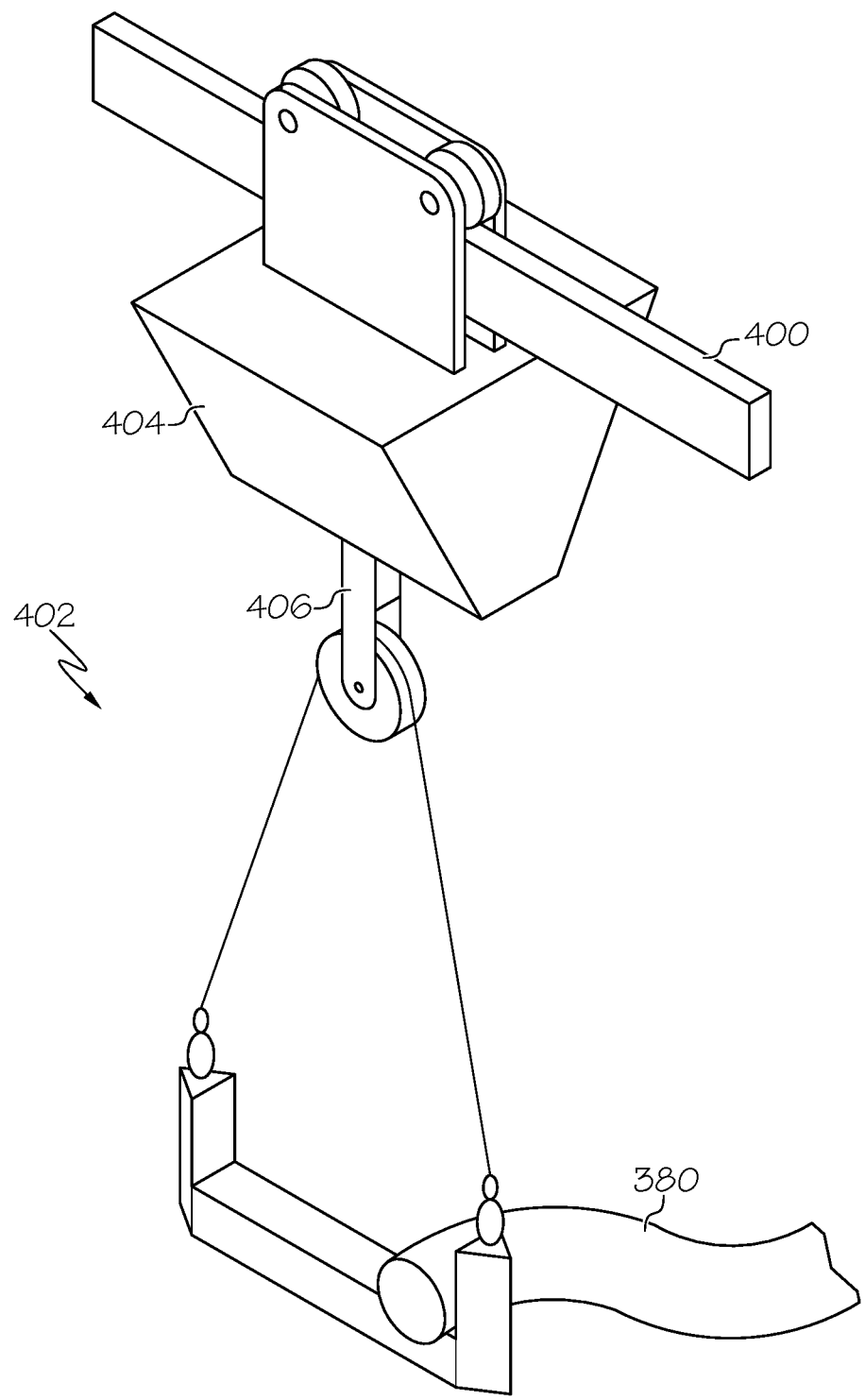
FIG. 16 is a perspective view of a glass fining system according to one or more embodiments shown or described herein.

Referring now to FIGS. 15 and 16, embodiments of the glass fining system 100 may include a supportive structure 400 that at least partially surrounds the glass fining modules 102. The supportive structure 400 provides support to various components of the glass fining system 100 and may offload support of those components from the refractory metal vessel 110.

The supportive structure 400 may include hangers 402 that extend from the supportive structure and are coupled to various components of the glass fining system 100, for example, electrical leads 380. The hangers 402 support the weight of the electrical leads 380, such that stress imparted on the refractory metal vessel 110 by the weight of the electrical leads 380 is minimized. In one embodiment, the hangers 402 are supported by trolleys 404 that translate in the longitudinal direction 80 of the glass fining system 100. The trolleys 404 allow the hangers 402 to provide support to the electrical leads 380 and translate to minimize misalignment of the electrical leads 380 relative to the conductor flanges 160 to which the electrical leads 380 are coupled throughout the heating and cooling cycles of the glass fining system 100. For example, as the glass fining system 100 increases in temperature from room temperature to its operating temperature, the refractory metal vessel 110 can expand, which may cause the conductor flanges 160 to translate in the longitudinal direction 80. The trolleys 404 may translate with the conductor flanges 160, such that the hangers 402 continue to provide support in a vertical direction 84 to the electrical leads 380. Therefore, expansion and contraction of the components of the glass fining system 100 have minimal effect on stress imparted by the electrical leads 380 of the glass fining system 100.

In some embodiments, as shown in FIG. 16, the hangers 402 may include spring supports 406. The spring supports 406 exhibit a spring constant that can allow the spring support to provide continuous vertical support to the electrical leads 380 while the electrical leads move in a vertical direction 84. For example, when the refractory metal vessel 110 is brought to elevated temperatures, the refractory metal vessel 110 expands radially and longitudinally. Radial expansion of the refractory metal vessel 110 changes the elevation of the conductor flange 160. In order to minimize the stress imparted onto the refractory metal vessel 110 by the weight of the conductor flanges 160, the spring supports 406 may be selected and fitted such that a vertical force is applied to the conductor flanges 160, even when the conductor flanges 160 are shifted vertically in their position. The spring supports 406, therefore, maintain support of the electrical leads 380 in a manner that is independent of a position of the electrical leads 380 relative to the supportive structure 400. The hangers 402, therefore, may minimize the introduction of stress to components of the glass fining system 100, for example, the refractory metal vessel 110, as those components are heated and cooled throughout the operating cycle.

It should now be understood that glass fining systems according to the present disclosure include a refractory metal vessel and a plurality of insulation layers that surround at least a portion of the refractory metal vessel in a glass fining module. Various embodiments of the glass fining system have elements that reduce the stress imparted into the refractory metal vessel. In one embodiment, the glass fining module includes rollers that allow the glass fining modules to be repositioned in the longitudinal direction while minimizing stress that is imparted to the refractory metal vessel. Such elements allow for the glass fining system to be cycled from room temperature to its operating temperature while imparting a minimal amount of stress to the refractory metal vessel. Reducing the stress of this refractory metal vessel may increase the usable life of the refractory metal vessel and may allow for higher temperatures, larger cross-sectional areas, or longer overall lengths to be used in the glass fining operation.

Terminology and Interpretative Norms

The term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature.

Numerical values, including endpoints of ranges, can be expressed herein as approximations preceded by the term "about," "approximately," or the like. In such cases, other embodiments include the particular numerical values. Regardless of whether a numerical value is expressed as an approximation, two embodiments are included in this disclosure: one expressed as an approximation, and another not expressed as an approximation. It will be further understood that an endpoint of each range is significant both in relation to another endpoint, and independently of another endpoint.

Directional terms as used herein—for example up, down, right, left, front, back, top, bottom, vertical, horizontal—are made only with reference to the figures as drawn and are not intended to imply absolute orientation unless otherwise expressly stated.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise. Also, the word "or" when used without a preceding "either" (or other similar language indicating that "or" is unequivocally meant to be exclusive—e.g., only one of x or y, etc.) shall be interpreted to be inclusive (e.g., "x or y" means one or both x or y).

The term "and/or" shall also be interpreted to be inclusive (e.g., "x and/or y" means one or both x or y). In situations where "and/or" or "or" are used as a conjunction for a group of three or more items, the group should be interpreted to include one item alone, all the items together, or any combination or number of the items. Moreover, terms used in the specification and claims such as have, having, include, and including should be construed to be synonymous with the terms comprise and comprising.

Unless otherwise indicated, all numbers or expressions, such as those expressing dimensions, physical characteristics, and the like, used in the specification (other than the claims) are understood to be modified in all instances by the term "approximately." At the very least, and not as an attempt to limit the application of the doctrine of equivalents to the claims, each numerical parameter recited in the specification or claims which is modified by the term "approximately" should be construed in light of the number of recited significant digits and by applying ordinary rounding techniques.

All disclosed ranges are to be understood to encompass and provide support for claims that recite any and all subranges or any and all individual values subsumed by each range. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

All disclosed numerical values are to be understood as being variable from 0-100% in either direction and thus provide support for claims that recite such values or any and all ranges or subranges that can be formed by such values. For example, a stated numerical value of 8 should be understood to vary from 0 to 16 (100% in either direction) and provide support for claims that recite the range itself (e.g., 0 to 16), any subrange within the range (e.g., 2 to 12.5) or any individual value within that range (e.g., 15.2).

The drawings shall be interpreted as illustrating one or more embodiments that are drawn to scale and/or one or more embodiments that are not drawn to scale. This means the drawings can be interpreted, for example, as showing: (a) everything drawn to scale, (b) nothing drawn to scale, or (c) one or more features drawn to scale and one or more features not drawn to scale. Accordingly, the drawings can serve to provide support to recite the sizes, proportions, and/or other dimensions of any of the illustrated features either alone or relative to each other. Furthermore, all such sizes, proportions, and/or other dimensions are to be understood as being variable from 0-100% in either direction and thus provide support for claims that recite such values or any and all ranges or subranges that can be formed by such values.

The terms recited in the claims should be given their ordinary and customary meaning as determined by reference to relevant entries in widely used general dictionaries and/or relevant technical dictionaries, commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used in a manner that is more expansive than its ordinary and customary meaning, the term should be given its ordinary and customary meaning plus the additional expansive meaning, or (b) if a term has been explicitly defined to have a different meaning by reciting the term followed by the phrase "as used in this document shall mean" or similar language (e.g., "this term means," "this term is defined as," "for the purposes of this disclosure this term shall mean," etc.). References to specific examples, use of "i.e.," use of the word "invention," etc., are not meant to invoke exception (b) or otherwise restrict the scope of the recited claim terms. Other than situations where exception (b) applies, nothing contained in this document should be considered a disclaimer or disavowal of claim scope.

The subject matter recited in the claims is not coextensive with and should not be interpreted to be coextensive with any embodiment, feature, or combination of features described or illustrated in this document. This is true even if only a single embodiment of the feature or combination of features is illustrated and described in this document.

It will be apparent to those skilled in the art that various modifications and variations can be made without departing from the spirit or scope of the claimed subject matter. Accordingly, the claimed subject matter is not to be restricted except in light of the attached claims and their equivalents.

What is claimed is:

1. A glass manufacturing apparatus comprising:
   a glass fining module comprising:
      a refractory metal vessel comprising a length extending in a longitudinal direction;
      a plurality of insulation layers surrounding at least a portion of the refractory metal vessel, the plurality of insulation layers comprising:
         an insulation structure extending around at least the portion of the refractory metal vessel and comprising a plurality of arched portions, wherein the plurality of arched portions comprises a relief region between at least one of the plurality of arched portions and an adjacent arched portion of the insulation structure, the relief region accommodating thermal expansion of the plurality of arched portions and mitigating the development of hoop stresses in the plurality of arched portions as the glass manufacturing apparatus is heated from room temperature to operational temperatures; and
         a bulk insulation structure surrounding the insulation structure;
      an exterior support structure at least partially surrounding the plurality of insulation layers; and
      rollers coupled to the exterior support structure such that the glass fining module is translatable in the longitudinal direction on the rollers, wherein the refractory metal vessel comprises a stiffening rib extending from the refractory metal vessel and oriented perpendicular to the refractory metal vessel, the stiffening rib positioned in the relief region of the insulation structure.

2. The glass manufacturing apparatus of claim 1, wherein the exterior support structure comprises:
   vertical tie supports extending in a vertical direction;
   lateral tie supports extending in a lateral direction perpendicular to the vertical direction, the lateral tie supports coupled to the vertical tie supports by springs that apply a first force in the vertical direction to the plurality of insulation layers; and
   longitudinal tie supports extending in the longitudinal direction, the longitudinal tie supports coupled to the vertical tie supports by springs that apply a second force in the lateral direction to the plurality of insulation layers.

3. The glass manufacturing apparatus of claim 1, wherein the stiffening rib is spaced apart from the plurality of arched portions of the insulation structure.

4. The glass manufacturing apparatus of claim 1, wherein the stiffening rib extends from an upper portion of the refractory metal vessel.

5. The glass manufacturing apparatus of claim 1, wherein the refractory metal vessel comprises an end plate coupled to the stiffening rib.

6. The glass manufacturing apparatus of claim 1, wherein at least a portion of the refractory metal vessel is spaced apart from the insulation structure when the glass fining module is at room temperature.

7. The glass manufacturing apparatus of claim 1, wherein the glass fining module further comprises at least one conductor flange in contact with the refractory metal vessel, the conductor flange circumscribing an exterior of the refractory metal vessel and positioned at a longitudinal end of the refractory metal vessel.

8. The glass manufacturing apparatus of claim 7, wherein the at least one conductor flange comprises a bus portion coupled to electrical leads and a distribution portion in contact with the refractory metal vessel.

9. The glass manufacturing apparatus of claim 8, wherein the distribution portion comprises a non-uniform cross-sectional width.

10. The glass manufacturing apparatus of claim 8, wherein the exterior support structure comprises a translatable support coupled to the bus portion and a spring configured to apply a force to the bus portion in a vertical direction.

11. The glass manufacturing apparatus of claim 1, further comprising a plurality of glass fining modules arranged sequentially.

12. The glass manufacturing apparatus of claim 11, further comprising a tie rod selectively coupling the plurality of glass fining modules to one another in the longitudinal direction.

13. The glass manufacturing apparatus of claim 11, wherein the refractory metal vessel is a continuous refractory metal vessel extending through each of the plurality of glass fining modules.

14. A glass manufacturing apparatus comprising:
a plurality of glass fining modules, each glass fining module comprising:
a refractory metal vessel comprising a length extending in a longitudinal direction;
a plurality of conductor flanges coupled to the refractory metal vessel, the plurality of conductor flanges circumscribing an exterior of the refractory metal vessel and positioned at opposite longitudinal ends of the refractory metal vessel;
a plurality of insulation layers surrounding at least a portion of the refractory metal vessel, the plurality of insulation layers comprising:
an insulation structure comprising a plurality of arched portions, wherein the plurality of arched portions comprises a relief region between at least one of the plurality of arched portions and an adjacent arched portion of the insulation structure, the relief region accommodating thermal expansion of the plurality of arched portions and mitigating the development of hoop stresses in the plurality of arched portions as the glass manufacturing apparatus is heated from room temperature to operational temperatures;
a bulk insulation structure surrounding the insulation structure; and
an exterior support structure at least partially surrounding the plurality of insulation layers, wherein:
the refractory metal vessel of each glass fining module comprises a stiffening rib extending from the refractory metal vessel and oriented perpendicular to the refractory metal vessel, the stiffening rib positioned in the relief region of the insulation structure; and
the refractory metal vessel of sequential glass fining modules of the plurality of glass fining modules are maintained at different operating temperatures.

15. The glass manufacturing apparatus of claim 14, wherein each glass fining module of the plurality of glass fining modules comprises rollers coupled to the exterior support structure such that each glass fining module is translatable in the longitudinal direction on the rollers.

16. The glass manufacturing apparatus of claim 14, wherein the exterior support structure of each glass fining module of the plurality of glass fining modules comprises:
vertical tie supports extending in a vertical direction;
lateral tie supports extending in a lateral direction and coupled to the vertical tie supports with springs configured to apply a first force in the vertical direction of the plurality of insulation layers; and
longitudinal tie supports extending in the longitudinal direction and coupled to the vertical tie supports with springs that apply a second force in the lateral direction to the plurality of insulation layers.

17. The glass manufacturing apparatus of claim 14, wherein the refractory metal vessel of each glass fining module of the plurality of glass fining modules are joined as a continuous refractory metal vessel extending through the plurality of glass fining modules.

18. A glass manufacturing apparatus comprising:
a continuous refractory metal vessel comprising a length extending in a longitudinal direction, the continuous refractory metal vessel comprising a plurality of stiffening ribs arranged along an outer diameter of the continuous refractory metal vessel and oriented perpendicular to the continuous refractory metal vessel;
conductor flanges electrically coupled to the continuous refractory metal vessel, the conductor flanges circumscribing an exterior surface of the continuous refractory metal vessel;
a plurality of glass fining modules through which the continuous refractory metal vessel extends, each glass fining module of the plurality of glass fining modules comprising:
a plurality of insulation layers surrounding at least a portion of the continuous refractory metal vessel, the plurality of insulation layers comprising:
an insulation structure comprising a plurality of arched portions, wherein the plurality of arched portions comprises a plurality of relief regions positioned between adjacent ones of the plurality of arched portions of the insulation structure, the relief regions accommodating thermal expansion of the plurality of arched portions and mitigating the development of hoop stresses in the plurality of arched portions as the glass manufacturing apparatus is heated from room temperature to operational temperatures, wherein each stiffening rib of the plurality of stiffening ribs is positioned in a corresponding relief region of the plurality of relief regions; and
a bulk insulation structure surrounding the insulation structure; and
an exterior support structure at least partially surrounding the plurality of insulation layers.

19. The glass manufacturing apparatus of claim 18, wherein the plurality of arched portions are spaced apart from the plurality of stiffening ribs of the continuous refractory metal vessel.

20. The glass manufacturing apparatus of claim 18, wherein at least a portion of the continuous refractory metal vessel is spaced apart from the insulation structures of the plurality of glass fining modules when the plurality of glass fining modules are at room temperature.

\* \* \* \* \*

UNITED STATES PATENT AND TRADEMARK OFFICE
CERTIFICATE OF CORRECTION

PATENT NO.        : 12,017,944 B2
APPLICATION NO.   : 17/277948
DATED             : June 25, 2024
INVENTOR(S)       : De Angelis et al.

Page 1 of 1

It is certified that error appears in the above-identified patent and that said Letters Patent is hereby corrected as shown below:

On the Title Page

In Column 1, item [60], insert --Related U.S. Application Data Provisional application No. 62/737498, filed on September 27, 2018.--

Signed and Sealed this
Thirteenth Day of May, 2025

Coke Morgan Stewart
*Acting Director of the United States Patent and Trademark Office*